United States Patent [19]
Hayes et al.

[11] Patent Number: 4,618,348
[45] Date of Patent: Oct. 21, 1986

[54] COMBUSTION OF VISCOUS HYDROCARBONS

[75] Inventors: Michael E. Hayes, Fernandina Beach; Kevin R. Hrebenar, Jacksonville; Patricia L. Murphy; Laurence E. Futch, Jr., both of Fernandina Beach; James F. Deal, III, Amelia Island, all of Fla.

[73] Assignee: Petroleum Fermentations N.V., Curaco, Netherlands Antilles

[21] Appl. No.: 547,892

[22] Filed: Nov. 2, 1983

[51] Int. Cl.⁴ .................................................. C10L 1/32
[52] U.S. Cl. .................................... 44/51; 252/309; 252/312; 252/356; 431/1
[58] Field of Search ............... 44/51; 252/309, 312, 252/356; 431/2

[56] References Cited

U.S. PATENT DOCUMENTS

| | | | |
|---|---|---|---|
| 2,981,683 | 4/1961 | Simpson et al. | 252/8.3 |
| 3,006,354 | 10/1961 | Sommer et al. | 137/13 |
| 3,352,109 | 11/1967 | Lissant | 60/217 |
| 3,380,531 | 4/1968 | McAuliffe | 166/45 |
| 3,425,429 | 2/1969 | Kane | 137/13 |
| 3,467,195 | 9/1969 | McAuliffe et al. | 166/45 |
| 3,487,844 | 1/1970 | Simon et al. | 137/13 |
| 3,490,237 | 1/1970 | Lissant | 60/217 |
| 3,490,471 | 1/1970 | Carlin | 137/13 |
| 3,519,006 | 7/1970 | Simon et al. | 137/13 |
| 3,630,953 | 12/1971 | Simon et al. | 166/314 |
| 3,876,391 | 4/1975 | McCoy et al. | 44/51 |
| 3,902,869 | 9/1975 | Friberg et al. | 44/51 |
| 3,941,692 | 3/1976 | Gutnick et al. | 210/11 |
| 3,943,954 | 3/1976 | Flournoy et al. | 137/13 |
| 3,958,915 | 5/1976 | Noda et al. | 431/9 |
| 4,002,435 | 1/1977 | Wenzel et al. | 44/51 |
| 4,046,519 | 9/1977 | Piotrowski | 44/51 |
| 4,084,940 | 4/1978 | Lissant | 44/51 |
| 4,086,164 | 4/1978 | Noda et al. | 210/46 |
| 4,134,415 | 1/1979 | Flournoy et al. | 137/13 |
| 4,158,551 | 6/1979 | Feuerman | 44/51 |
| 4,162,143 | 7/1979 | Yount, III | 44/51 |
| 4,192,767 | 3/1980 | Flournoy et al. | 252/312 |
| 4,230,801 | 10/1980 | Gutnick et al. | 210/11 |
| 4,234,689 | 11/1980 | Gutnick et al. | 210/11 |
| 4,239,052 | 12/1980 | McClaflin | 137/13 |
| 4,246,919 | 1/1981 | McClaflin | 137/13 |
| 4,246,920 | 1/1981 | McClaflin | 137/13 |
| 4,249,554 | 2/1981 | McClaflin | 137/13 |
| 4,265,264 | 5/1981 | Sifferman | 137/13 |
| 4,273,611 | 6/1981 | Blasio et al. | 159/47 WL |
| 4,276,094 | 6/1981 | Gutnick et al. | 210/11 |
| 4,285,356 | 8/1981 | Sifferman | 137/13 |
| 4,287,902 | 9/1981 | McClaflin et al. | 137/13 |
| 4,311,829 | 8/1982 | Gutnick et al. | 210/11 |
| 4,311,830 | 1/1982 | Gutnick et al. | 210/11 |
| 4,311,831 | 1/1982 | Gutnick et al. | 210/11 |
| 4,311,832 | 1/1982 | Gutnick et al. | 210/11 |
| 4,315,755 | 2/1982 | Hellsten et al. | 44/51 |
| 4,333,488 | 6/1982 | McClaflin | 137/13 |
| 4,382,802 | 5/1983 | Beinke et al. | 44/51 |
| 4,392,865 | 7/1983 | Grosse et al. | 44/51 |
| 4,395,354 | 7/1983 | Gutnick et al. | 252/356 |
| 4,445,908 | 1/1984 | Compere et al. | 44/51 |
| 4,477,258 | 10/1984 | Lepain | 44/51 |

OTHER PUBLICATIONS

R. E. Barrett et al., "Design, Construction and Preliminary Combustion Trials of a Rig to Evaluate Residual Fuel-Oil/Water Emulsions", Battelle M. I., Columbus, Ohio, PB-214260, Jul. 15, 1970.
R. Helion et al., "Reduction of Flue Gas Emissions by Burning Fuel-Oil-Water Emulsions", VGB Kraftwerkstechnik 1975, 55(2), 88–93, [59–Air Pollution, Ind. Hyg. vol. 84, 1976, p. 335, No. 84:78995g].

(List continued on next page.)

Primary Examiner—Mrs. Y. Harris-Smith
Attorney, Agent, or Firm—Pennie & Edmonds

[57] ABSTRACT

Methods and compositions are provided to facilitate the transporation and combustion of highly viscous hydrocarbons by forming reduced viscosity hydrocarbon-in-water emulsions, and in particular, bioemulsifier-stabilized hydrocarbon-in-water emulsions.

21 Claims, 10 Drawing Figures

OTHER PUBLICATIONS

N. Moriyama et al., "Emulsifying Agents for Oil-in-Water Type Emulsion Fuels", Japan Kokai 77-151305, Dec. 15, 1977, Based on Appl. No. 76/68,530, Jun. 11, 1976, [51-Fossil Fuels, vol. 80, 1978, p. 145, No. 89:8710q].

A. Iwama, "Single Droplet Combustions of Emulsified Hydrocarbon Fuels. II. Comparison of Combustion Characteristics Between O/W and W/O Emulsions", Nenryo Kyokaishi 1979, 58(632): 1041-54, (Japan) [Chem. Abstr. vol. 93, 1980, p. 204, No. 93:50075u].

Rosenberg et al., "Interaction of *Acinetobacter* RAG-1, Emulsan with Hydrocarbons" in: Advances in Biotechnology, vol. III, Fermentation Products, Proceedings of the VIth International Fermentation Symposium held in London, Canada, Jul. 20-25, 1980, pp. 461-466, (M. Moo-Young, Ed., 1981).

Y. Murakami et al., "Burning of Emulsified Oil Waste", Osaka Kogyo Gijutsu Shikensho Kiho 1972, 23(3), 184-8, [Chem. Abstr. vol. 78, 1973, p. 222, No. 61800t].

H. Ludewig, "Hydrocarbon-Emulsifier-Water Emulsion", East German Patent. No. 93,398, Oct. 20, 1972, based on Appl. No. 148,658, Jul. 8, 1970, [Chem. Abstr. vol. 80, 1974, p. 150, No. 85531y].

K. Enzmann et al., "Preparation of Fuel Oil-in-Water Emulsions for Combustion", Universal'n Dezintegratorn Aktivatsiya Tallin 1980, 82-6, (Russ.) from Ref. Zh. Khim 1980, Abstr. No. 14P334 [51-Fossil Fuels vol. 93, 1980, p. 147, No. 93:170678q].

O. Neumeister et al., "Method and Apparatus for Preparing Fuel-Water Emulsions", East German Patent No. DD216,863, Jan. 2, 1985, based on Appl. No. 253,527, Jul. 29, 1983.

R. E. Barrett et al., "Residual Fuel Oil-Water Emulsions", Battelle M. I., Columbus, Ohio, PB-189076, Jan. 12, 1970.

COMBUSTION OF VISCOUS HYDROCARBONS

TABLE OF CONTENTS

1. Introduction
2. Background of the Invention
 2.1. Viscous Hydrocarbons
 2.2. Transportation of Viscous Hydrocarbons
 2.3. Combustion of Oil-in-Water Emulsions
 2.4. Microbial Surface Active Compounds
3. Summary of the Invention
4. Nomenclature
5. Brief Description of the Figures
6. Detailed Description of the Invention
 6.1. Surfactant Packages
 6.2. Viscous Crude Oils and Residual Oils
 6.3. Hydrocarbosol Formation
 6.4. Properties of Emulsan-Stabilized Hydrocarbosols
 6.5. Transportation and Utilization of Hydrocarbosols
7. Examples
 7.1. Preparation of α-Emulsan
 7.2. Crude Oil Characteristics
  7.2.1. Boscan Crude Oil
  7.2.2. Texas Fireflood Crude Oil
  7.2.3. Number 6 Residual Test Fuel Oil
  7.2.4. Methods for Determining Crude Oil Characteristics
 7.3. Viscosity Reduction Experiments
  7.3.1. Surfactant Packages and Emulsification of Oils
  7.3.2. Effect of Methanol in Aqueous Phase on Hydrocarbosol Viscosity
  7.3.3. Effect on Water Content on Hydrocarbosol Viscosity
  7.3.4. Temperature Effects on Hydrocarbosols
  7.3.5. Comparative Static Testing
  7.3.6. Stabilizer Comparisons
 7.4. Pipelining Pilot Test
 7.5. Direct Combustion Test on Number 6 Fuel Oil Hydrocarbosol
  7.5.1. Furnace Assembly and Instrumentation
  7.5.2. Preparation of Hydrocarbosol for Combustion Test
  7.5.3. Combustion Test Procedure
  7.5.4. Results of Combustion Test

INTRODUCTION

This invention rdlates to the application of bioemulsifiers to the utilization of highly viscous hydrocarbons, including heavy crude oils and residual oils. More particularly, this invention relates to the transportation and combustion of viscous hydrocarbons through the formation of low-viscosity bioemulsifier-stabilized hydrocarbon-in-water emulsions, or hydrocarbosols, in which the hydrocarbon droplets dispersed in the continuous aqueous phase are substantially stabilized from coalescence by the presence of bioemulsifiers and in particular, microbial bioemulsifiers, surrounding the droplets at the hydrocarbon/water interface.

Transportation of highly viscous hydrocarbons via conventional pipelines or other methods, including tankers and barges, presently cannot be accomplished practically without reduction of viscosity of the hydrocarbons to a pumpable form. This invention presents an alternative means to viscosity reduction, potentially more economical than methods requiring heating or dilution with lighter petroleum stocks. Formation of hydrocarbon-in-water emulsions effectively reduces the viscosity of heavy hydrocarbon materials, thereby facilitating shipping and pumping with conventional equipment, as well as in situ handling. Furthermore, the hydrocarbon-in-water emulsions formed by the methods of this invention can be burned directly by conventional means, without de-watering or demulsification.

Under circumstances where transportation distances from production location to utilization sites are considerable, giving rise to long transit times and/or the potential for shutdowns en route, or where long storage periods are required, the use of hydrocarbosols is especially advantageous. Because the microbial bioemulsifiers predominantly reside at the hydrocarbon/water interface, essentially covering the surface of the hydrocarbon droplets, the hydrocarbon droplets are effectively protected from coalescence and the reduced viscosity of the hydrocarbosols is effectively maintained over time. The substantial stability and improved pumpability of the hydrocarbosols allows them to be transported practically over long distances or remain stationary for long periods of time prior to utilization.

2. BACKGROUND OF THE INVENTION

2.1. VISCOUS HYDROCARBONS

While large quantities of high-quality, relatively inexpensive, light crude oils presently are recoverable from world-wide geographical locations, ever-increasing consumption of petroleum fuels and other petroleum products and the energy crisis precipitated by such high demands have brought interest to bear on the enormous reserves of low-gravity, viscous hydrocarbons which also exist throughout the world. Viscous hydrocarbons present in natural deposits have been generally classified as viscous crude oils, bitumen or tar and have been variously called heavy crudes, native bitumen, natural bitumen, oil sands, tar sands, bituminous sands or deposits and natural asphalts, all of which materials are chemically gradational and nearly indistinguishable without standardized analyses. [For a discussion of the general characteristics of viscous hydrocarbons and the problem of precisely defining or classifying them, see Meyer, "Introduction" in: The Future of Heavy Crude and Tar Sands, p. 1, Mining Informational Services, McGraw Hill, Inc., New York (1981). See also Section 6.2 infra.]

The geographical distribution of heavy crude reserves is given in Table I [abstracted from Meyer and Dietzman (1981), "World Geography of Heavy Crude Oils," in: The Future of Heavy Crude and Tar Sands, pp. 16–28, Mining Informational Services, McGraw Hill, Inc., New York (1981)]. The total estimated figure for oil in place is $6200 \times 10^9$ barrels. Venezuela heads the list with roughly half of this total, $3000 \times 10^9$ barrels. Canada follows closely with $2950 \times 10^9$ barrels (this total includes hydrocarbon in bitumen), while the United States has an estimated $77 \times 10^9$ barrels. To put these figures in perspective, the total world reserves of oil lighter than 20° API is estimated to be about $660 \times 10^9$ barrels. Yet undiscovered reserves are estimated at $900 \times 10^9$ barrels. Thus, heavy crude is more plentiful than conventional oil by about a factor of four.

TABLE I
WORLD HEAVY OIL DEPOSITS
(Billions of Barrels)

| Country | Resource In-Place | Estimated Recoverable |
|---|---|---|
| Venezuela | 3000 | 500 |
| Canada | 2950 | 213 |
| United States | 77 | 30 |
| Italy | 12 | 1 |
| Madagascar | 25 | 1 |
| Iran | 29 | 3 |
| Iraq | 10 | 1 |

It is clear that reserves of conventional light crudes are being depleted much faster than heavy crudes and that development of world reserves of viscous hydrocarbons will eventually become necessary to support world petroleum demands. Significant production of heavy crudes has begun, primarily by steam-assisted enhanced recovery methods. For example, recent estimates place production of heavy crude oil in California at 250,000 barrels per day. Future estimates [Barnea, "The Future of Heavy Crude and Tar Sands," in: The Future of Heavy Crude and Tar Sands, pp. 13–15, Mining Informational Services, McGraw Hill, Inc., New York (1981)] project that by the year 2000, production of heavy oil plus the bitumen from tar sands will increase to one-third of the world's total oil production. Such rapid development of heavy oil resources will extend the petroleum era and should: (1) allow products from heavy crudes to benefit from the existing energy infrastructure; (2) assure fuel supplies to the transportation sector and feed-stock to petrochemical plants; (3) be a stabilizing factor for world petroleum prices, increasing the number of oil producing countries; (4) reduce the strategic and political aspects of oil production; and (5) postpone the need for massive investments in coal conversion and other facilities for synthetic oil production.

2.2. Transportation of Viscous Hydrocarbons

The problem of transporting viscous hydrocarbons, be it out of a producing well, off a tanker or, especially, through a pipeline, is one of pumpability. Consequently, methods for transporting viscous hydrocarbons such as heavy crude oils have focused on modifying the oil into a pumpable form. Two general approaches have been considered. For waxy crudes, it is desirable to transport the oil above its pour point, i.e., above the temperature at which wax crystals in the oil inhibit its ability to flow. One method directed to this end is the use of pour-point depressants to reduce the pour point and maintain fluidity. Generally, this method is of value only with those oils of sufficiently low viscosities to permit transportation at ambient temperatures.

For highly viscous crudes, the approach taken has been to reduce the viscosity. When the crude is to be transported by pipeline, the viscosity must be sufficiently reduced to flow through conventional lines using conventional pumping equipment. Several methods have been used to reduce the viscosities of heavy crude oils for pipelining purposes. These methods include preparation of oil/solid slurries, mixing water with oil to form reduced viscosity emulsions, heating the oil to lower its viscosity and diluting the oil with low viscosity hydrocarbons such as condensate, gasoline, or naphtha [Sloan et al., "Pipeline Transportation of Heavy Oils", in: The Future of Heavy Crude and Tar Sands, pp. 719–726, Mining Informational Services, McGraw-Hill, Inc. New York (1981)].

Reported methods for reducing the viscosities of viscous hydrocarbons by forming oil-in-water emulsions for the purposes of transporting them through pipelines or pumping them from wells have involved the use of chemical additives. Among the chemicals which have been proposed or used are bases such as sodium hydroxide or ammonia [U.S. Pat. Nos. 3,380,531; 3,487,844; and 3,006,354], nonionic surfactants [U.S. Pat. Nos. 3,425,429 and 3,467,195] and combinations of nonionic and anionic surfactants [U.S. Pat. Nos. 4,239,052 and 4,249,554]. Stability of oil-in-water emulsions can present a problem; for instance, oil-in-water emulsions are known to break or invert into unpumpable forms. Increasing the amount of chemicals used to maintain stability can result in prohibitive costs.

It is notable that in a recent review of methods for pipelining heavy crude oils (see Sloan et al.; supra) it was pointed out that there have been limited, if any, commercial applications of the emulsion approach to pipelining. It is also noteworthy that Sloan et al. concluded that the heating and dilution methods for reducing viscosity, despite the fact that they are energy-intensive and relatively costly, remain the major candidates for pipelining transport of heavy crude oils.

2.3. Combustion of Oil-in-Water Emulsions

The vast majority of combustible emulsions known in the art are water-in-oil emulsions, primarily consisting of relatively small amounts of water (1–10% by volume) in oil to enhance combustion. Some combustible oil-in-water emulsions have been described [see e.q., U.S. Pat. Nos. 3,958,915; 4,273,611 and 4,382,802]. Notably, however, the oil phases used have been light, low viscosity fuels and other low viscosity oils, e.g., kerosene, gasoline, gas oil, fuel oils and other oils which are liquid at room temperature. Combustible thixotropic jet fuels and other safety fuels have been described in U.S. Pat. Nos. 3,352,109; 3,490,237 and 4,084,940. Under resting (stationary) conditions, these oil-in-water emulsions are in the form of gels with apparent rest viscosities of 1000 cps and preferably 50,000–100,000 cps. These thixotropic oil-in-water emulsions exhibit low viscosities under high pumping (high shear) rates.

2 4. Microbial Surface Active Compounds

Many microbes can utilize hydrocarbon as their sole source of carbon for growth and energy production. The hydrocarbon substrates may be linear, branched, cyclic or aromatic. In order to rapidly assimilate such water-insoluble substrates, the microbes require a large contact area between themselves and the oil. This is achieved by emulsifying the oil in the surrounding aqueous medium. Hydrocarbon degrading microbes frequently synthesize and excrete surface active agents which promote such emulsification.

For example, the growth of *Mycobacterium rhodochrous* NCIB 9905 on n-decane yields a surface active agent which was reported by R.S. Holdom et al. [J. Appl. Bateriol. 32, 448 (1969)] to be a nonionic detergent. J. Iguichi et al. [Agric Biol. Chem., 33, 1657 (1969)] found that *Candida petrophilium* produced a surface active agent composed of peptides and fatty acid moieties, while T. Suzuki et al. [Agric. Biol. Chem., 33, 1919 (1969)] found trehalose lipid in the oil phase of culture broths of various strains of Arthrobacter, Brevibacterium, Corynebacterium and Nocardia. Wagner has reported the production of trehalose lipids by *Nocardia rhodochrous* and *Mycobacterium phlei* and their use in oil recovery [U.S. Pat. Nos. 4,392,892 and 4,286,660].

*Torulopsis gropengiesseri* was found to produce a sophorose lipid, while rhamnolipids are reported by K. Hisatsuka et al. [Agric. Biol. Chem., 35, 686 (1971)] to have been produced by *Pseudomonas aeruginosa* strain S7B1 and by S. Itoh et al. [Agric. Biol. Chem., 36, 2233 (1971)] to have been produced by another *P. aeruginosa* strain, KY4025. The growth of *Corynebacterium hydrocarboclastus* on kerosene was reported by J. E. Zajic and his associates [Dev. Ind. Microbiol., 12, 87 (1971); Biotechnol. Bioeng., 14, 331 (1972); Chemosphere 1, 51 (1972); Crit. Rev. Microbiol., 5, 39; U.S. Pat. No. 3,997,398] to produce an extracellular heteropolysaccharide which, among other properties, emulsified kerosene, Bunker C fuel oil and other fuel oils.

Gutnick et al. discovered that Acinetobacter sp. ATCC 31012 produces interfacially active extracellular protein-associated lipopolysaccharide biopolymers called emulsans. Acinetobacter sp. ATCC 31012 produces α-emulsans when grown on ethanol or fatty acid salts [U.S. Pat. Nos. 4,230,801; 4,234,689 and 4,395,354] and β-emulsans when grown on crude oil or hexadecane [U.S. Pat. No. 3,941,692]. The α-emulsans and β-emulsans can be derivatized to an O-deacylated form called Ψ-emulsans [U.S. Pat. No. 4,380,504]. The α-emulsans, β-emulsans and Ψ-emulsans can be deproteinized to yield apo-α-emulsans, apo-β-emulsans and apo-Ψ-emulsans, respectively [U.S. Pat. Nos. 4,311,830; 4,311,829 and 4,311,831, respectively].

Cooper and Zajic [Adv. Appl. Microbiol. 26:229–253 (1980)] have reviewed the production of surface active compounds by microorganisms. Some of the surface active agents described are listed in Table II.

TABLE II

| MICROBIAL SURFACE ACTIVE COMPOUNDS | |
|---|---|
| STRUCTURAL TYPE | PRODUCING MICROORGANISM(S) |
| Carbohydrates-Lipids | |
| Trehalose-Lipids | Nocardia, Mycobacterium, Corynebacterium, Arthrobacter |
| Rhamnose-Lipids | Pseudomonas aeruginosa |
| Sophorose-Lipids | Torulopsis spp. |
| Polysaccharide-Lipid | Candida tropicalis, Acinetobacter calcoaceticus |
| Amino Acid-Lipids | |
| Lipopeptides | Bacillus, Streptomyces, Corynebacterium, Mycobacterium |
| Ornithine-Lipids | Pseudomonas, Thiobacillus, Agrobacterium, Gluconobacter |
| Phospholipids | Thiobacillus, Corynebacterium, Candida, Micrococcus |
| Fatty Acids/Neutral Lipids | Pseudomonas, Mycococcus, Penicillium, Aspergillus, Acinetobacter, Micrococcus, Candida |

3. SUMMARY OF THE INVENTION

This invention provides novel compositions and methods for manipulating viscous hydrocarbons, generally characterized by API gravities of about 20° API or less, viscosities of about 100 centipoise or greater at 150° F., paraffin contents of about 50% by weight or less, and aromatic contents of about 40% or greater by weight, into an emulsified form which (a) can be stored in facilities or transported by methods presently used to handle less viscous materials and (b) can be burned directly as quality combustible fuels. In an embodiment preferred for transportation purposes, the emulsified form of the viscous hydrocarbon is a hydrocarbosol defined as a bioemulsifer-stabilized hydrocarbon-in-water emulsion wherein the individual hydrocarbon droplets are essentially covered by water-soluble bioemulsifier molecules predominantly residing at the hydrocarbon/water interface, which bioemulsifier molecules form an effective barrier against droplet coalescence and hence promote the maintenance of discrete hydrocarbon droplets dispersed in a continuous, low-viscosity aqueous phase. The hydrocarbosols of this invention have viscosities reduced by at least a factor of about 10 and preferably at least $10^2$ compared to that of the viscous hydrocarbon starting material, said hydrocarbosol viscosities remaining so reduced under static conditions for periods of at least about 1 day, and preferably at least about 30 days.

Surfactant packages for forming hydrocarbosols are provided which comprise a water-soluble chemical surfactant, or a combination of water-soluble chemical and/or biological co-surfactants, preferably nonionic and anionic surfactants, together with a bioemulsifier which, because of any number of characteristics including, but not limited to, high molecular weight, highly specific three-dimensional structure, hydrophobic and hydrophilic nature, polymeric nature and/or sparing solubility in hydrocarbons, binds tightly to the hydrocarbon/water interface and essentially covers the surface of individual hydrocarbon droplets in hydrocarbon-in-water emulsions, effectively maintaining discrete droplets and preventing coalescence and imparting substantial stability to hydrocarbon-in-water emulsions.

Methods are provided for transporting viscous hydrocarbons wherein a surfactant package is used in a proportion from about 1:100 to about 1:20,000 based on oil to form a hydrocarbosol containing up to about 90% by volume of hydrocarbon in an aqueous phase variously comprising deionized water, municipal water, brines or alcohol/water mixtures, which hydrocarbosol can be shipped by conventional means or pumped through conventional, non-heated pipelines.

Methods are also provided for utilizing viscous hydrocarbons by forming hydrocarbosol fuels or hydrocarbon-in-water emulsion fuels and burning them in conventional combustion facilities.

4. NOMENCLATURE

The term "hydrocarbosol" is defined as any bioemulsifier-stabilized hydrocarbon-in-water emulsion wherein the individual hydrocarbon droplets are essentially surrounded or covered by water-soluble bioemulsifier molecules predominantly residing at the hydrocarbon/water interface, which bioemulsifier molecules form an effective barrier against droplet coalescence and hence promote the maintenance of discrete hydrocarbon droplets suspended or dispersed in the continuous, low-viscosity aqueous phase.

The term "water-soluble" is defined to include water-dispersible substances.

The term "viscous hydrocarbon" is defined as any naturally occurring crude oil or any residual oil remaining after refining operations which is generally characterized by a viscosity of about $10^2$–$10^6$ centipoise or greater and otherwise generally, but not necessarily, characterized by an API gravity of about 20° API or less, high metal content, high sulfur content, high asphaltene content and/or high pour point.

The term "bioemulsifier" is defined as any biologically derived substance which, by virtue of any combination of characteristics including, but not limited to, high molecular weight, polymeric nature, highly specific three-dimensional structure, hydrophobic and hydrophilic moieties and sparing solubility in hydrocarbons, binds tightly to the hydrocarbon/water interface and essentially covers the surface of individual hydrocarbon droplets in hydrocarbon-in-water emulsions, effectively maintaining discrete droplets and preventing coalescence, and thereby imparting substantial stability to hydrocarbon-in-water emulsions. An example of a bioemulsifier is α-emulsan.

The term "biosurfactant" is defined as any biologically derived substance which reduces the interfacial tension between water and a hydrocarbon and, as a result, reduces the energy requirement (mixing energy) for creation of additional interfacial area. An example of a biosurfactant is a glycolipid.

The term "surfactant package" is defined as any composition useful for forming hydrocarbon-in-water emulsions of viscous hydrocarbons generally characterized by a paraffin content of about 50% by weight or less and an aromatic content of about 40% by weight or greater with viscosities of about 100 centipoise or greater at 150° F., which composition may comprise a chemical surfactant or a combination of chemical co-surfactants or a combination of co-surfactant(s) and biosurfactant(s) or a combination of chemical surfactant(s) and bioemulsifier(s) or a combination of chemical surfactant(s), biosurfactant(s) and bioemulsifier(s), and which may be in aqueous form.

The term "emulsans", which reflects the polysaccharide structure of these compounds and the exceptional bioemulsifier activity of these materials, generically identifies those extracellular microbial protein-associated lipoheteropolysaccharides produced by Acinetobacter sp. ATCC 31012 and its mutants, which may be subdivided into the α-emulsans and the β-emulsans. The name "apoemulsan" generically identifies those deproteinized lipopolysaccharides obtained from the emulsans.

The term "α-emulsans" defines those extracellular microbial protein-associated lipopolysaccharides produced by Acinetobacter sp. ATCC 31012 and its mutants in which the lipopolysaccharide components (i.e., without the associated protein) are completely N-acylated and partially 0-acylated heteropolysaccharides made up of major amounts of D-galactosamine and an aminouronic acid, the lipopolysaccharide components containing at least 5 percent by weight of fatty acid esters in which (1) the fatty acids contain from about 10 to about 18 carbon atoms; and (2) about 50 percent by weight or more of such fatty acids are composed of 2-hydroxydodecanoic acid and 3-hydroxydodecanoic acid. It follows, therefore, that the deproteinized α-emulsan are called "apo-α-emulsans".

The term "β-emulsans" defines those extracellular microbial protein-associated lipopolysaccharides produced by Acinetobacter sp. ATCC 31012 and its mutants in which the lipopolysaccharide components (i.e., without the associated protein) are completely N-acylated and partially O-acylated heteropolysaccharides made up of major amounts of D-galactosamine and an aminouronic acid, the lipopolysaccharide components containing less than 5 percent by weight of fatty acid esters in which (1) the fatty acids contain from about 10 to about 18 carbon atoms; and (2) less than 50 percent by weight of such fatty acids are composed of 2-hydroxydodecanoic acid. The deproteinized β-emulsans are called "apo-β-emulsans".

The term "Ψ-emulsans" defines the O-deacylated extracellular protein-associated microbial polysaccharides obtained from the emulsans, the protein-free components of such Ψ-emulsans being completely N-acylated heteropolysaccharides made up of major amounts of D-galactosamine and an aminouronic acid and containing - from 0 to 1 percent of fatty acid esters in which, when present, the fatty acids contain from about 10 to about 18 carbon atoms. These protein-free components are called "apo-Ψ-emulsans", regardless of how they are prepared.

The term "polyanionic heteropolysaccharide biopolymers" defines those biopolymers in which (a) substantially all of the sugar moieties are N-acylated aminosugars, a portion of which is N-acylated-D-galactosamine and another portion of which is N-acylated aminouronic acid, a part of the N-acyl groups of such heteropolysacchardide being N-3-hydroxydodecanoyl groups; and (b) at least 0.2 micromoles per milligram of such heteropolysaccharide consist of fatty acid esters in which (1) the fatty acids contain about 10 to about 18 carbon atoms and (2) about 50 percent by weight or higher of such fatty acids are composed of 2-hydroxydodecanoic acid and 3-hydroxydodecanoic acid.

5. BRIEF DESCRIPTION OF THE FIGURES

Figure 8:
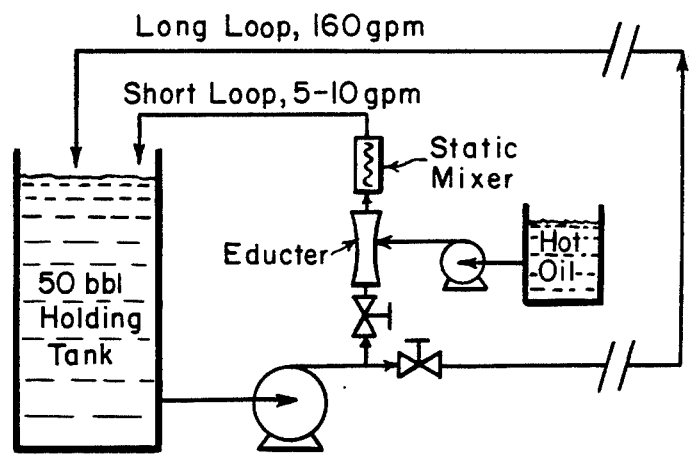
Figure 7:
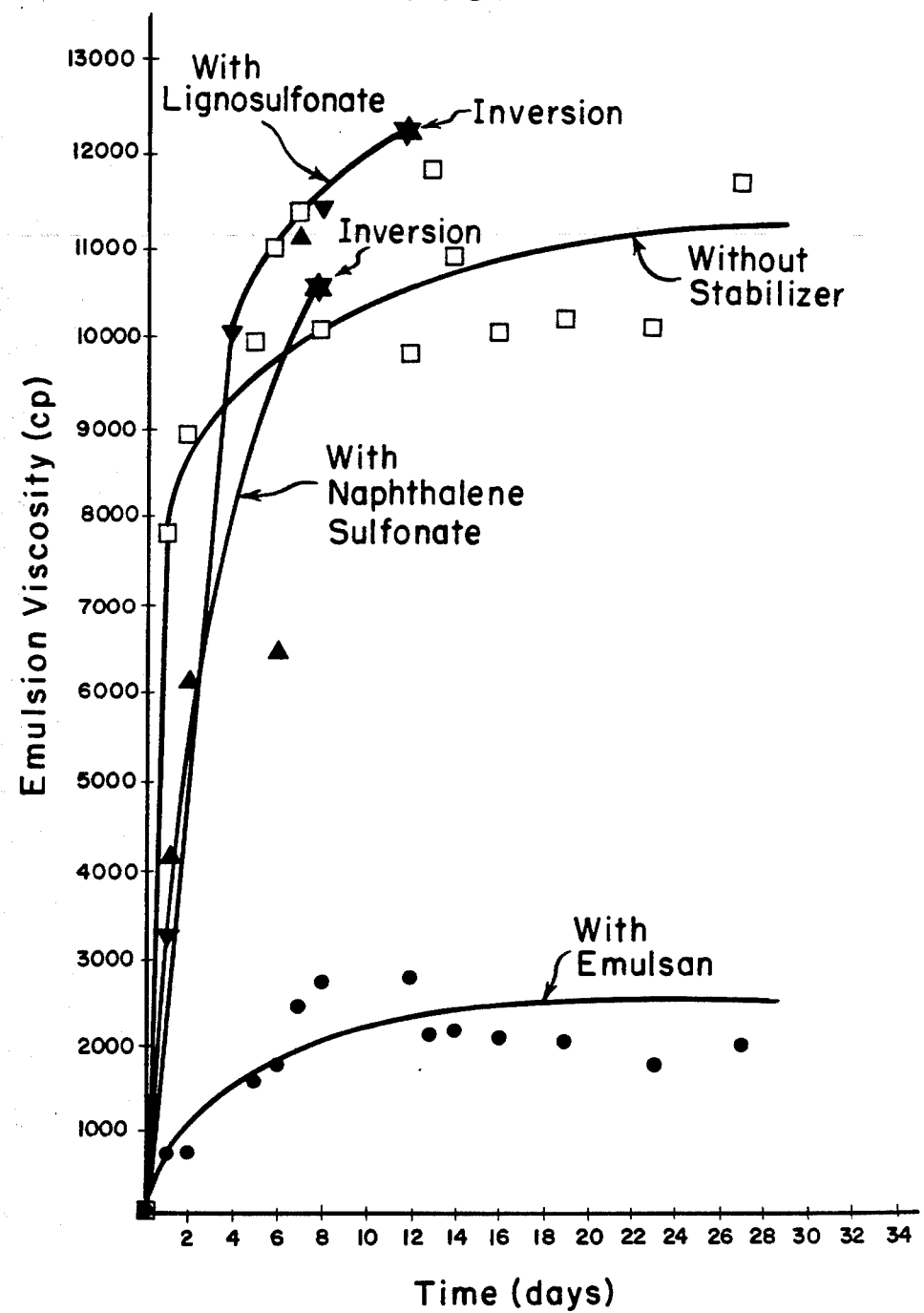
Figure 9:
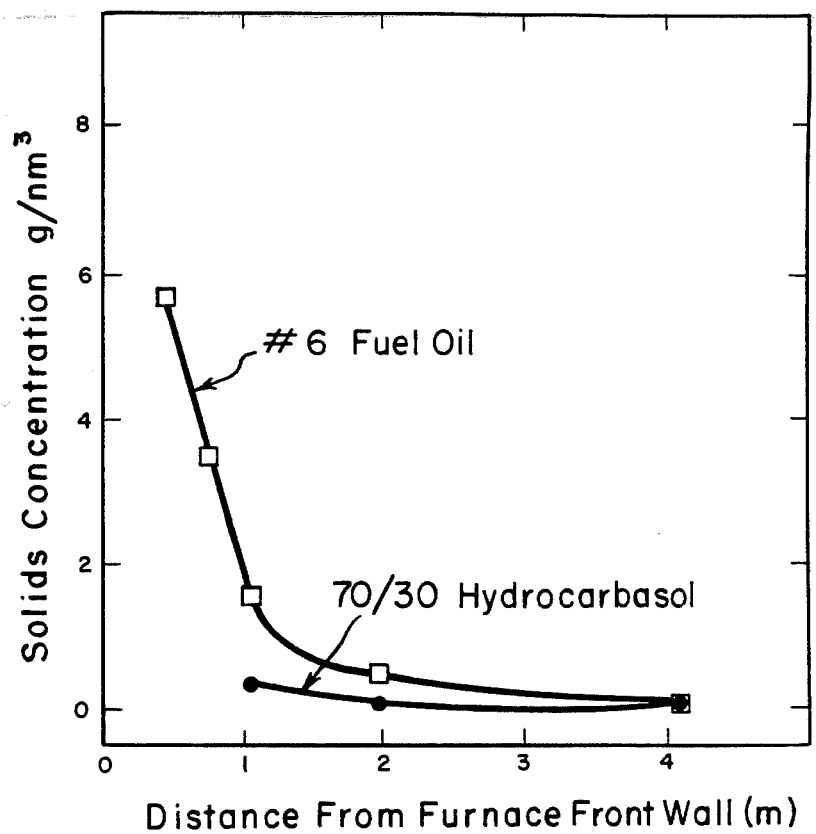
Figure 10:
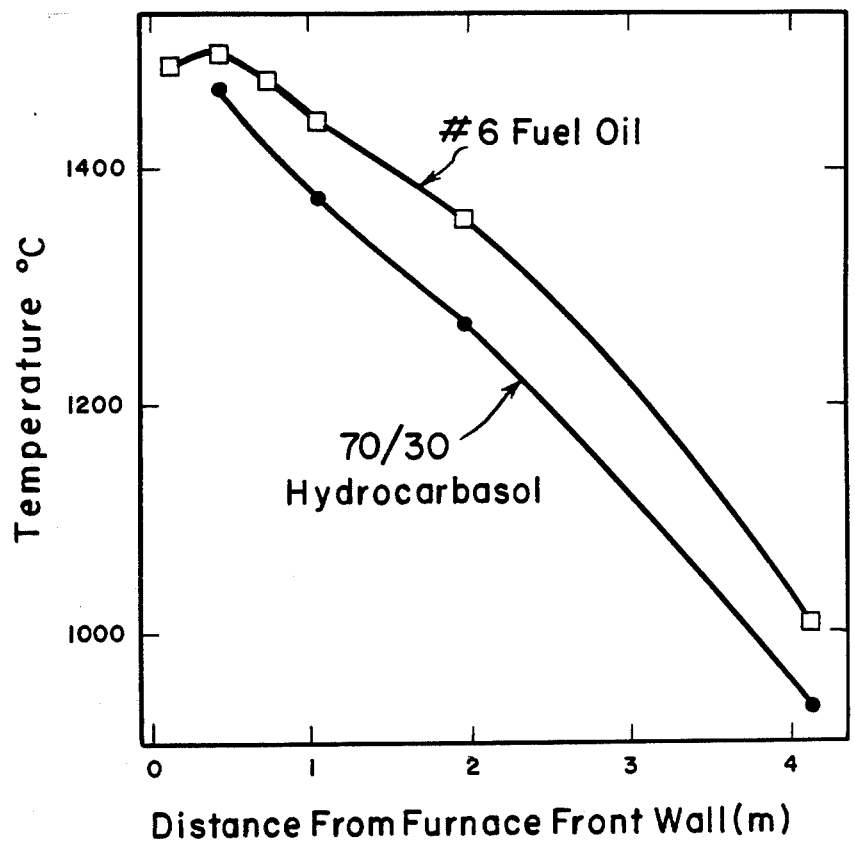

FIG. 7 is a graphical representation of the viscosity versus time profiles for four emulsions formulated with a Texas fireflood crude oil and a surfactant package comprising a nonionic surfactant and an anionic surfactant, comparing the effect on viscosity of the addition of an emulsion stabilizer (emulsan, or the commonly used emulsion stabilizers, lignin sulfonate and naphthalene sulfonate) to the surfactant package;

FIG. 8 is a schematic representation of a pilot system used for forming and pumping a hydrocarbosol through a three-inch pipeline;

FIG. 9 is a graphical representation of the changes in solids concentration along the flame axis during combustion of a Number 6 fuel oil and a hydrocarbosol of Number 6 fuel oil as a function of distance from the front wall of the furnace; and FIG. 10 is a graphical representation of the variation of axial flame temperatures during combustion of a Number 6 fuel oil and a hydrocarbosol of Number 6 fuel oil as a function of distance from the front wall of the furnace.

6. DETAILED DESCRIPTION OF THE INVENTION

6.1. Surfactant Packages

The surfactant packages of this invention can be formulated with a wide variety of chemical and microbial surface active agents and are preferably formulated with water-soluble surface active agents to provide for the formation of oil-in-water, as opposed to water-in-oil, emulsions. The surfactant packages can be formulated with numerous chemical surfactants, used alone or in conjunction with chemical co-surfactants of the same type (e.g., a combination of water-soluble nonionic surfactants) or of different types (e.g., a combination of water-soluble nonionic, anionic, cationic and/or amphoteric surfactants), and can be further formulated in combination with (a) a water-soluble biosufactant or combination of biosurfactants as co-surfactant(s) and/or (b) a water-soluble bioemulsifier or combination of bioemulsifiers as emulsion stabilizer(s). It is also possible to formulate surfactant packages comprising only microbial surface active agents, i.e., combinations of biosurfactants and bioemulsifiers. The surfactant packages of this invention are preferably formulated to comprise at least one chemical surfactant and at least one bioemulsifier. They are also preferably formulated to comprise at least one water-soluble nonionic surfactant, at least one water-soluble anionic surfactant, and at least one bioemulsifier.

The types of water-soluble nonionic chemical surfactants suitable for use in the surfactant packages are listed in Table III.

TABLE III
CLASSES AND SUBCLASSES OF NONIONIC CHEMICAL SURFACTANTS

Alcohols, ethoxylated
Alkylphenols, ethoxylated
Carboxylic Esters, ethoxylated
Glycerol Esters
Polyethylene Glycol Esters
Anhydrosorbitol Esters
Ethoxylated Anhydrosorbitol and Sorbitol Esters
Natural Fats and Oils, ethoxylated
Ethylene and Diethylene Glycol Esters
Propanediol Esters
Other Carboxylic Acid Esters
Carboxylic Amides, Ethoxylated The preferred water-soluble nonionic chemical surfactants are ethoxylated alkyl phenols and ethoxylated alcohols. The ethoxylated alkyl phenols are of the general formula:

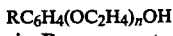

wherein R represents an alkyl group (either monoalkyl or dialkyl) containing from about 8 to about 12 carbon atoms (i.e., about $C_8$ to about $C_{12}$) and wherein n represents the number of ethoxy groups (moles ethylene oxide) which can range from about 1 to about 100. [For a list of commercially available ethoxylated alkylphenols, see "Surfactants and Detersive Systems" in: Encyclopedia of Chemical Technology, Kirk-Othmer (Third Edition), Volume 22, pp. 366-367, John Wiley & Sons, New York (1983).] Preferred ethoxylated alkyl phenols are those having R groups of 8 or 9 carbon atoms and having from about 7 to about 100 ethoxy groups. An example of a particularly preferred ethoxylated alkyl phenol is mononylphenol with about 40 ethoxy groups.

The ethoxylated alcohols are of the the general formula:

wherein R represents an aliphatic group (linear or branched) containing from about 6 to about 18 carbon atoms and wherein n represents the number of ethoxy groups which can range from about 2 to about 100. [For a list of commercially available ethoxylated alcohols, see "Surfactants and Detersive Systems" in: Encyclopedia of Chemical Technology, supra, pp. 364-365.] Examples of ethoxylated alcohols include ethoxylated trimethylnonanols with about 3 to about 9 ethoxy groups and ethoxylated secondary alcohols having R groups of about 11 to about 15 carbon atoms with about 3 to about 30 ethoxy groups, but preferably greater than about 7 ethoxy groups.

The types of water-soluble anionic chemical surfactants suitable for use in the surfactant packages of this invention are listed in Table IV.

TABLE IV
CLASSES AND SUBCLASSES OF ANIONIC CHEMICAL SURFACTANTS

Carboxylic Acids and Salts
Sulfonic Acids and Salts

Lignosulfonates
Alkylbenzenesulfonates
Alkylarylsulfonates, short chain
Naphthalenesulfonates
Petroleum Sulfonates
Sulfonates with ester, ether, or amide linkages
(dialkyl sulfosuccinates)
Other Sulfonates
Sulfuric Acid Esters and Salts Alcohols, sulfated
Alcohols, ethoxylated and sulfated
Alkylphenols, ethoxylated and sulfated
Acids, Amides, and Esters, sulfated
Natural Fats and Oils, sulfated
Phosphoric and Polyphosphoric Acid Esters (and Salts)

Alcohols and Phenols, alkoxylated and phosphated (and their Salts)
Other Phosphoric and Polyphosphoric Acid Esters (and their Salts)

The preferred water-soluble anionic chemical surfactants are sulfonated or sulfated forms of nonionic surfactants, particularly ethoxylated alcohol sulfates. Alkylaryl sulfonates are also preferred anionic chemical surfactants. The ethoxylated and sulfated alcohols are of the general formula:

$$R(OC_2H_4)_n OSO_3M$$

wherein R represents an aliphatic group containing from about 6 to about 16 carbon atoms, preferably from about 12 to about 14, n represents the number of ethoxy groups which can range from about 1 to about 4, preferably from about 2 to about 3, and M includes, but is not limited to, ammonium (NH$_4$), sodium (Na), potassium (K), calcium (Ca) or triethanolamine, preferably ammonium. [For a list of commercially available ethoxylated alcohol sulfates, see "Surfactants and Detersive Systems" in: Encyclopedia of Chemical Technology, supra, p. 357.] The alcohol moiety of the ethoxylated alcohol sulfate can be an even or odd number or mixture thereof. An example of a particularly preferred ethoxylated alcohol sulfate is poly(3)ethoxy C$_{12}$–C$_{14}$ linear primary alcohol sulfate, ammonium salt. It is also possible to use nonethoxylated alcohol sulfates, i.e., alcohol sulfates of the formula R(OC$_2$H$_4$)$_n$OSO$_3$M as described supra but wherein n=0.

The alkylaryl sulfonates are of the general formula:

$$R_n ArSO_3 M$$

wherein Ar is an aromatic group which is phenyl, tolyl, xylyl or ethylphenyl, R is a linear or branched chain alkyl group containing 4 to 16 carbon atoms, n is 1 or 2, the total number of carbon atoms in the R groups is from about 8 to about 16, and M includes, but is not limited to, ammonium, sodium, potassium, calcium or triethanolamine. [For a list of commercially available alkylaryl sulfonates, see "Surfactants and Detersive Systems" in: Encyclopedia of Chemical Technology, supra, p. 358.] An example of an alkylaryl sulfonate is a modified amine dodecylbenzene sulfonate.

The preferred water-soluble microbial surface active agents for use in the surfactant packages of this invention are any microbial substances which function as bioemulsifiers, i.e., substances which, by virtue of such characteristics as large molecular weight, polymeric nature, highly specific three-dimensional structure, hydrophobic and hydrophilic nature, and sparing solubility in oil, effectively cover the oil/water interface maintaining discrete, individual oil droplets in oil-in-water emulsions thereby substantially stabilizing emulsions from coalescence. Among the preferred bioemulsifiers are heteropolysaccharide biopolymers produced by bacteria of the genus Acinetobacter and the genus Arthrobacter, and in particular, those produced by strains of *Acinetobacter calcoaceticus*. Such Acinetobacter heteropolysaccharide biopolymers include, but are not limited to, polyanionic heteropolysaccharide biopolymers, α-emulsans, β-emulsans, Ψ-emulsans, apo-α-emulsans, apo-β-emulsans and apo-Ψ-emulsans produced by Acinetobacter sp. ATCC 31012 defined in Section 4 and described in U.S. Pat. Nos. 4,395,353; 4,395,354; 3,941,692; 4,380,504; 4,311,830; 4,311,829; and 4,311,831, respectively (hereby incorporated by reference) and also heteropolysaccharide biopolymers produced by *Acinetobacter calcoaceticus* BD4 [Taylor and Juni, J. Bacteriol. 81:688-693 (1961), hereby incorporated by reference]. Particularly preferred Acinetobacter heteropolysaccharide biopolymers are the α-emulsans, further described in U.S. Pat. Nos. 4,230,801 and 4,234,689 (hereby incorporated by reference). The α-emulsans are characterized by a Specific Emulsification Activity of about 200 units per millligram or higher, where one unit per milligram of Specific Emulsification Activity is defined as that amount of emulsifying activity per milligram of bioemulsifier which yields 100 Klett absorption units using a standard hydrocarbon mixture consisting of 0.1 ml of 1:1 (v/v) hexadecane/2-methylnaphthalene and 7.5 ml of Tris-Magnesium buffer.

Numerous other microbial organisms may possibly serve as a source of biological surface active agents, including biosurfactants and bioemulsifiers, for use in the surfactant packages of this invention. Some of these microorganisms and the types of compounds they produce are listed in Table V, though the list is not exhaustive. The surfactant packages of this invention may also be formulated with water-soluble cationic chemical surfactants, including, but not limited to, oxygen-free amines, oxygen-containing amines, amide-linked amines and quaternary ammonium salts. Use of cationic chemical surfactants in conjunction with microbial surface active agents would require that the charge characteristic of the biological compounds be considered. For example, cationic chemical surfactants would probably best be used in conjunction with neutral microbial surface active agents and would probably best not be used in conjunction with the preferred polyanionic heteropolysaccharide bioemulsifiers.

TABLE V

MICROBIAL SURFACE ACTIVE AGENTS

| Microbial Compound | Microbial Source |
|---|---|
| Carbohydrate-containing surface active agents | |
| Trehalose lipids | Arthrobacter spp. |
| | *Arthrobacter paraffineus* KY4303 |
| | Mycobacterium spp. |
| | *Mycobacterium smegmatis* |
| | *Mycobacterium kansasii* |
| | *Mycobacterium tuberculosis* |
| | *Mycobacterium phlei* |
| | *Mycobacterium rhodochrous* |
| | *Mycobacterium fortuitum* |
| | Nocardia spp. |
| | *Nocardia asteroides* |
| | *Nocardia rhodochrous* |
| | Corynebacterium spp. |
| | *Corynebacterium diphtheriae* |
| | Brevibacterium |
| Rhamnolipids | *Arthrobacter paraffineus* |
| | *Pseudomonas aeruginosa* |
| Sophorose lipids | Torulopsis spp. |
| | *Torulopsis magnoliae* |
| | *Torulopsis gropengiesseri* |
| Diglycosyl diglycerides | *Lactobacillus fermenti* |
| Polysaccharide-lipid complexes | Arthrobacter spp. |
| | *Candida tropicalis* |
| Amino acid-containing surface active agents | |
| Lipopeptides | *Bacillus subtilis* |
| | *Bacillus mesentericus* |
| | *Candida petrophilum* |
| | *Streptomyces canus* |
| | *Corynebacterium lepus* |
| | *Nocardia asteroides* |
| | *Mycobactrium paratuberculosis* |
| | *Mycobacterium fortuitum* |
| Ornithine lipids | *Pseudomonas rubescens* |
| | *Thiobacillus thioxidans* |
| | *Agrobacterium tumefaciens* |
| | *Gluconobacter cerinus* |
| Protein | *Pseudomonas aeruginosa* |
| Phospholipids | *Thiobacillus thiooxidans* |
| | *Corynebacterium lepus* |
| | *Corynebacterium alkanolyticum* |
| | *Candida tropicalis* |
| | *Micrococcus cerificans* |

TABLE V-continued
MICROBIAL SURFACE ACTIVE AGENTS

| Microbial Compound | Microbial Source |
|---|---|
| Fatty acids and Neutral lipids | |
| Carboxylic acids | Corynbacterium lepus |
| | Pseudomonas spp. |
| | Mycococcus spp. |
| | Penicillium spp. |
| | Aspergillus spp. |
| | Acinetobacter spp. |
| | Micrococcus cerificans |
| | Candida cloacae |
| Neutral lipids and mixtures of fatty acids | Mycobacterium rhodochrous |
| | Arthrobacter paraffineus |
| | Arthrobacter paraffineus ATCC 19558 |
| | Mycobacterium lacticolum |
| | Acinetobacter spp. |
| | Thiobacillus thiooxidans |
| Polysaccharides | |
| Heteropolysaccharides | Xanthomonas campestris |
| | Xanthomonas campestris NRRL B1459 |
| | Arthrobacter viscosus |
| | Arthrobacter viscosus NRRL B1973 |
| | Methylomonas spp. |
| Homopolysaccharides | Lactobacillus spp. |
| | Methylomonas mucosa NRRL B5696 |
| Lipopolysaccharides | Acinetobacter calcoaceticus |
| | Acinetobacter calcoaceticus ATCC 31012 |
| | Pseudomonas fluorescens |
| | Yersinia pseudotuberculosis |
| | Yersinia pestis |
| | S. calcoaceticus |
| Other Surface Active Agents | |
| unknown or poorly characterized | Pseudomonas spp. |
| | Pseudomonas aeruginosa |
| | Pseudomonas oleororans |
| | Pseudomonas putida |
| | Pseudomonas desmolyticam |
| | Pseudomonas methanica |
| | Corynebacterium spp. |
| | Corynebacterium sp. ATCC 21235 |
| | Corynebacterium hydrocarboclastus UW0409 |
| | Bacillus subtillus |
| | Bacillus hexacarbororum |
| | Candida spp. |
| | Candida utilis |
| | Candida utilis ATCC 9226 |
| | Candida guilliermondii |
| | Candida rugosa |
| | Candida lypolytica |
| | Aspergillus niger |
| | Aspergillus versicolor |
| | Desulfovibrio hydrocarbonoclasticus |
| | Desulfovibrio desulfuricans |
| | Endomycopsis lipolytica |
| | Saccharomycopsis lipolytica |
| | Aerobacter aerogenes |
| | Aerobacter aceti |
| | Aerobacter peroxydans |
| | Alcaligines entrophus |
| | Achromobacter spp. |
| | Achromobacter sp. ATCC 21910 |
| | Achromobacter agile |
| | Achromobacter tropunctatum |
| | Actinomyces oligocarbophilus |
| | Aureobasidium pullulans |
| | Arthrobacter sp. ATCC 21908 |
| | Micrococcus spp. |
| | Micrococcus sp. ATCC 21909 |
| | Micrococcus cerificans ATCC 14987 |
| | Micrococcus paraffinae |
| | Microbacterium thodochrous |
| | Mycobacterium phlei |
| | Nocardia opacus |
| | Nocardia corrallina |
| | Pencillium spp. |
| | Pichia spartinae |

Surfactant packages can be formulated from nonionic chemical surfactants or combinations of nonionic and anionic chemical surfactants (preferably in about a 1:1 ratio by weight) without bioemulsifiers but preferably with bioemulsifiers in the range of about 1% to about 50% by weight. Surfactant packages comprising bioemulsifiers in the range of about 10% to about 20% by weight and particularly around 15% by weight are preferred. Examples of surfactant packages are: (a) about 10% to about 15% α-emulsan by weight in combination with ethoxylated secondary alcohols having carbon chains of about 11 to about 15 carbon atoms in length [e.g., Tergitol 15-S-X (Union Carbide Corp.), where X represents the number of moles of ethylene oxide and is preferably greater than 7]; (b) about 10% to about 15% α-emulsan by weight in combination with about 20% to about 25% by weight of an ethoxylated trimethylnonanol [e.g., Tergitol TMN-6 (Union Carbide Corp.)] and about 60% to about 70% by weight of an ethoxylated alkyl phenol [e.g., Triton X-114 (Rohn & Haas Co.)]; and (c) about 15% α-emulsan by weight in combination with an ethoxylated alkyl phenol having an R group of about 8 or 9 carbon atoms [e.g., Tergitol NP-40 (Union Carbide Corp.)]. A particularly preferred surfactant package comprises about 10% to about 20% α-emulsan by weight in combination with a nonionic ethoxylated alkyl phenol [e.g., Tergitol NP-40] and an anionic ethoxylated alcohol sulfate [e.g., Alfonic 1412-A (Conoco, Inc.)], using the nonionic and anionic surfactants in a proportion of about 1:1. The particularly preferred surfactant packages are exemplified by the surfactant package comprising about 15% by weight α-emulsan, about 42.5% by weight Tergitol NP-40 and about 42.5% by weight Alfonic 1412-A. Surfactant packages may be formulated full strength or in diluted aqueous solution.

6.2. VISCOUS CRUDE OILS AND RESIDUAL OILS

The surfactant package compositions of this invention can be used to emulsify or emulsify and substantially stabilize numerous viscous hydrocarbons in oil-in-water emulsions which may be subsequently transported and/or directly burned. As there is no universally accepted, precise definition of the viscous hydrocarbons suitable for use in this invention, they are best described in terms of their general characteristics. Viscous hydrocarbons encompass naturally-occuring viscous crude oils (also called heavy crude oils) as well as bottom-of-the-barrel products from refineries, such as vacuum resid, other residual fuel oils and asphalt. While low gravity does not necessarily coincide with high density, these characteristics are generally correlated in viscous hydrocarbons.

Generally, the following characteristics are considered typical of the types of crude oils and residual oils, the handling and utilization of which can be facilitated by the compositions and methods of this invention:

1. Low API gravity, generally at or below about 20° API. This is the most frequently used criterion, both because it is easily measured and because 20° API crude roughly corresponds to the lower limit recoverable with conventional production techniques.
2. Viscosities in the range of about $10^2$ to $10^6$ centipoise (cp) or even higher in some cases.
3. High metal contents. For example, heavy crudes often have nickel and vanadium contents as high as 500 ppm.
4. High sulfur content, e.g., 3 weight percent or more.
b 5. High asphaltene content.
6. High pour point.

It is to be noted, of course, that lighter crudes may also be emulsified and/or stabilized with the surfactant packages of this invention. However, since the transportation and combustion of light oils do not present the same problems as highly viscous crudes and residuals, the compositions and methods of this invention are more particularly directed to the use of heavy materials. Those viscous hydrocarbons which can be emulsified with the surfactant packages of this invention and which are most useful to emulsify for transportation and/or burning purposes can be generally defined as having a paraffin content of about 50% by weight or less and an aromatic content of about 40% by weight or greater with viscosities of about 100 centipoise or greater at 150° F.

More specifically, the types of crude oils that can be successfully emulsified and stabilized with the surfactant packages of this invention include Boscan (Venezuela) crude, an east Texas crude, Jibaro and Bartra (Peru) crudes, El Jobo (Venezuela) crude, and a Kansas crude. Furthermore, residual fuel oils such as those classified as ASTM Grade Number 6 Oils can also be emulsified. Number 6 oils, sometimes referred to as "Bunker C" oils, are high-viscosity oils used mostly in commercial and industrial heating. Their utilization normally requires preheating in the storage tank to permit pumping, and additional preheating at the burner to permit atomizing. The extra equipment and maintenance required to handle Number 6 fuels in nonemulsified form usually precludes its use in small installations. The ASTM standard specifications for Number 6 fuel oils are summarized in Table VI ["Standard Specification for Fuel Oils," ASTM Designation D396-80, in: 1981 Book of ASTM Standards, Part 23].

ous phase can also be an alcohol/water mixture such as methanol/water, ethanol/water or other lower alkanol/water mixtures, and may further contain additives such as anti-corrosion agents, anti-pollution agents or combustion improvers. Hydrocarbosols preferably contain oil/water ratios of about 60/40 to about 80/20, and more preferably from about 65/35 to about 75/25.

In forming hydrocarbosols (or, alternatively, non-stabilized oil-in-water emulsions), it is economically desirable to use as little of the surfactant package as possible while maintaining acceptable emulsion characteristics to suit the particular transportation or utilization requirements. The surfactant packages of Section 6.1 can be used in proportions of surfactant package:hydrocarbon from about 1:100 to about 1:20,000 by weight. The proportion used can depend on the type of hydrocarbon to be emulsified and/or the purpose for emulsifying it.

Hydrocarbosol formation can be brought about by any number of suitable procedures. For example, the aqueous phase containing an effective amount of surfactant package can be contacted with the hydrocarbon phase by metered injection just prior to a suitable mixing device. Metering is preferably maintained such that the desired hydrocarbon/water ratio remains relatively constant. Mixing devices such as pump assemblies or in-line static mixers can be used to provide sufficient agitation to cause emulsification. As a more specific example, for the transportation or utilization of residual oils, it may be possible to emulsify the hot residual oil in about 30% aqueous phase (v/v) with one of the surfactant packages of Section 6.1 as it exits the vacuum still of a refinery.

6.4. PROPERTIES OF EMULSAN-STABILIZED HYDROCARBOSOLS

The hydrocarbon droplets of hydrocarbon-in-water emulsions generally rise to the surface and "float" on the aqueous phase in a process known as creaming, provided the density of the hydrocarbon phase is less than that of the aqueous phase and the droplets in the dispersed phase are too big to be stabilized by Brownian motion. If the "cream" remains undisturbed for a given period of time, the droplets coalesce, giving rise to two

TABLE VI

| | | | | | | | | |
|---|---|---|---|---|---|---|---|---|
| DETAILED REQUIREMENTS FOR NUMBER 6 FUEL OILS | | | | | | | | |
| | Flash Point, °C. (°F.) | Water and Sediment, Vol % | Saybolt Viscosity, s[1] | | | | Kinematic Viscosity, cSt[1] At 50° C. (122° F.) | |
| | | | Universal at 38° C. (100° F.) | | Furol at 50° C. (122° F.) | | | |
| Grade of Fuel Oil | Min | Max | Min | Max | Min | Max | Min | Max |
| No. 6 Preheating required for burning and handling | 60 (140) | 2.00[2] | (>900) | (9000) | (>45) | (300) | >92 | 638 |

[1]Viscosity values in parentheses are for information only and not necessarily limiting.
[2]The amount of water by distillation plus the sediment by extraction shall not exceed 2.00%. The amount of sediment by extraction shall not exceed 0.50%. A deduction in quantity shall be made for all water and sediment in excess of 1.0%.

6.3. HYDROCARBOSOL FORMATION

The surfactant packages of Section 6.1 can be used to form hydrocarbosols (or, alternatively, non-stabilized oil-in-water emulsions) containing as much as about 90% by volume of the viscous hydrocarbons described in Section 6.2. The aqueous phase into which the hydrocarbon is emulsified can be deionized water, water from a municipal source, or any water, even water with relatively large amounts of dissolved solids such as connate waters or brines, normally located in proximity to oil production, transportation or utilization sites. The aqueseparate phases. The emulsans, particularly α-emulsan, are extremely effective in retarding coalescence and the emulsan-stabilized droplets in the "cream" are easily redispersible in the aqueous phase.

The principal factors controlling emulsion stability are electrostatic (charge) effects and steric effects. The properties of emulsans lend themselves to optimal exploitation of these mechanisms. Their large molecular weight and highly specific three-dimensional structure result in an efficient coverage of the hydrocarbon/water interface. This effectively prevents oil-to-oil contact when collisions occur between adjacent droplets. Simultaneously, the polyanionic nature of emulsans causes the surfaces of emulsion droplets to be negatively charged which creates repulsive forces and significantly decreases the collision frequency between hydrocarbon droplets. In addition, the absence of multimolecular emulsan micelles in the water phase and the lack of emulsan solubility in the hydrocarbon phase provides an efficient migration and attachment of the emulsan molecules to the oil/water interface. The overall chemical requirements for emulsion stabilization thus become very small and directly related to the oil droplet size, i.e., interfacial area desired.

The advantages that emulsans offer over classical emulsion stabilizers may be summarized as follows. In a hydrocarbosol, emulsan predominantly resides at the oil/water interface only; essentially no measurable emulsan is found in the water phase nor in the oil phase. Very small amounts of emulsan are required, even in the presence of excess water. The emulsan-stabilized hydrocarbosol effectively resists inversion to water-in-oil emulsions, even at water:oil ratios of less than about 1:4. This is partly due to emulsans' insolubility in oil and may also be due in part to the specific three-dimensional structure of the emulsan molecule.

6.5 TRANSPORTATION AND UTILIZATION OF HYDROCARBOSOLS

Hydrocarbosols have properties which allow them to be transported in tankers, barges and more importantly through conventional pipelines, including standard, non-heated pipeline networks. Among the properties exhibited by hydrocarbosols that are particularly important for pipelining are reduced viscosity, stabilization against coalescence even under considerable rates of shear, compatibile formation with high-salinity aqueous phases, and non-corrosive nature. Hydrocarbosols with viscosities below about 500 cp at about 60° F. allow the economical use of centrifugal pumps for transportation of oil at acceptable flow rates and reasonable pressure drops. For pipelining purposes, it is desirable to use the surfactant packages of Section 6.1 at their minimum effective concentrations which frequently are in a proportion within the range of about 1:100 to about 1:5,000. Hydrocarbosols may be stored in non-heated storage tanks where agitation may be optionally supplied to maintain homogenity.

Once transported to their destination, hydrocarbosols can be demulsified if desired. More importantly, hydrocarbosols can be utilized directly, without dewatering, as burnable fuels. They can be used in combustion facilities which presently use Number 6 fuel oils, or so-called Bunker C oils, to fire, inter alia, steam generators, heating systems or blast furnaces. Hydrocarbosols may potentially allow for less expensive plant operation by reducing fuel costs, storage costs and material handling costs. Hydrocarbosols may have applications as substitutes for Number 2 or higher grade fuels depending on the situation.

Where long storage periods or transportation over long distances prior to utilization is not required, the stability exhibited by hydrocarbosols becomes less critical. If short distance-transportation or on-site utilization is contemplated, it may not be necessary to form bioemulsifier-stabilized emulsions. Further, it is not necessary to form stabilized emulsions in order to facilitate combustion; i.e., emulsion stability is not generally required for good combustion characteristics. Therefore, emulsion fuels suitable for burning can be made by emulsifying viscous hydrocarbons with the surfactant packages of Section 6.1 which are formulated with a chemical surfactant alone or a combination of chemical surfactants. For instance, a 70/30, Number 6 fuel oil/water emulsion can be made with a surfactant package comprising a nonionic chemical surfactant and an anionic chemical surfactant in equal proportion by weight and the resulting oil-in-water emulsion can be burned directly.

7. EXAMPLES

7.1 PREPARATION OF α-EMULSAN

The α-emulsans produced by Acinetobacter sp. ATCC 31012 during fermentation on ethanol are known bioemulsifiers as described in U.S. Pat. No. 4,395,354, incorporated by reference supra. The α-emulsans used in the experiments described infra were from a drum-dried technical grade batch and were treated in the following manner prior to use. A 10% by weight suspension of technical grade α-emulsan was prepared in deionized water and heated to 50°–60° C. while continuously stirring. The pH of the suspension was adjusted to pH 8.5 by adding 50% by weight sodium hydroxide (diluted, if necessary). Protease enzyme (NOVO Industries, 1.5M Alcalase) was added at a level of 1 part protease: 500 parts solid α-emulsan. The mixture was allowed to remain at 50°–60° C. while being stirred for about three hours. Reactions were run to completion as judged by the absence of visible precipitable emulsan following centrifugation of the reaction mixture. After completion of the enzyme treatment, the reaction mixtures were raised to approximately 70° C. to denature the protease and stop its activity. The solutions were cooled to room temperature and Cosan PMA-30 (Cosan Corporation), a preservative, was added at a level of 1 part Cosan: 500 parts emulsan solution.

7.2 CRUDE OIL CHARACTERISTICS

7.2.1. BOSCAN CRUDE OIL

The Boscan crude oil used in the experiments described infra was a heavy crude produced from the oilfields of western Venezuela. The characteristics of the crude, its specific gravity, API gravity (° API), paraffin content (% by weight), aromatic content (% by weight) and viscosity (in centipoise) versus temperature (degrees Fahrenheit) profile, were determined experimentally and are summarized in Table VII.

TABLE VII

| BOSCAN CRUDE OIL CHARACTERISTICS | |
|---|---|
| Specific Gravity = | 0.983 |
| API Gravity (calculated) = | 12.5° API |
| Paraffin content = | 25.8% (w/w) |
| Aromatic content = | 48.8% (w/w) |
| Viscosity (cp) | Temperature (°F.) |
| 4,500 | 140 |
| 24,000 | 100 |
| 192,000 | 60 |

7.2.2 TEXAS FIREFLOOD CRUDE OIL

The Texas crude oil used in the experiments described infra was produced from an oilfield in east Texas (Quitman, TX) by the fireflood method. The characteristics of the crude, its specific gravity at 26° C. [ASTM D1217-81], API gravity, paraffin content, aromatic content and viscosity versus temperature profile, were determined experimentally and are summarized in Table VIII.

TABLE VIII

TEXAS FIREFLOOD CRUDE OIL CHARACTERISTICS

| Specific Gravity = | 0.981 |
| API Gravity (calculated) = | 12.7° API |
| Paraffin content = | 26.1% (w/w) |
| Aromatic content = | 51.1% (w/w) |

| Viscosity (cp) | Temperature (°F.) |
| --- | --- |
| 1,748 | 160 |
| 4,085 | 140 |
| 8,752 | 120 |
| 27,615 | 100 |
| 82,000 | 80 |

7.2.3. NUMBER 6 RESIDUAL TEST FUEL OIL

The Number 6 residual fuel oil used in the experiment described in Section 7.5 was obtained from the MIT Energy Laboratory (Cambridge, Mass.). The characteristics of this residual fuel oil, its specific gravity, API gravity, paraffin content, aromatic content and viscosity versus temperature profile were determined experimentally and are summarized in Table IX.

TABLE IX

RESIDUAL NO. 6 TEST FUEL OIL CHARACTERISTICS

| Specific Gravity = | 0.977 |
| API Gravity (calculated) = | 13.3° API |
| Paraffin content = | 23.7% (w/w) |
| Aromatic content = | 76.3% (w/w) |

| Viscosity (cp) | Temperature (°F.) |
| --- | --- |
| 1,200 | 100 |
| 5,000 | 70 |
| 20,000 | 40 |

7.2.4 Methods for Determining Crude Oil Characteristics

Viscosity versus temperature profiles were obtained by heating the oils to the given temperatures of Tables VII, VIII and IX and measuring viscosities in a Rheomat 30 rheometer (Contraves AG), at an approximate shear rate of 30 sec.$^{-1}$.

The paraffin content and aromatic content of the oils were determined by a method in which the oil is separated into fractions based on hydrocarbon solubilities in n-heptane and methylene chloride. The paraffin fraction is defined as that hydrocarbon fraction which is soluble in n-heptane. The aromatic fraction is defined s that hydrocarbon fraction which is soluble in methylene chloride.

The materials used are as follows: an analytical balance, accurate to 0.1 milligram (mg), a 500 millimeter (mm) burette-type chromatography column, tared collection flasks, reagent grade methylene chloride, n-heptane (99 mole percent) and alumina adsorbent. The alumina was activated by heating it in an oven set at 310° C. for 12-14 hours. The alumina was cooled in a dessicator and stored in a tightly capped bottle prior to use. Chromatography columns packed ¾ full were used.

The separation was carried out by quantitatively weighing 500 to 1000 mg (±0.1 mg) of sample oil. Viscous oils were weighed into sample pouches made of tissue paper which were subsequently placed into the column. (Non-viscous oils are usually weighed directly into the columns.) After introduction of the sample oil into the columns, 200 to 250 ml of n-heptane were allowed to flow through the column. It was preferable for the solvent to be added in a manner which did not excessively disturb the alumnina packing. The eluent was collected in a tared evaporating flask. After all the n-heptane had flowed through the column, the first evaporating flask was replaced with another tared flask. Methylene chloride was then introduced into the column and allowed to flow through it.

The collected eluents were removed from each flask by vacuum evaporation following appropriate safety precautions. The dry flasks were reweighed and the percentage of paraffins and aromatics were calculated based on the original weight of the oil sample. All samples were run in duplicate.

Specific gravity was determined by weighing a measured volume of sample oil and calculating the ratio of the mass of the oil to the mass of an equal volume of water. API gravities were then calculated from the specific gravity by the general formula:

$$°API = \frac{141.5}{\text{specific gravity at } 60/60° \text{ F.}} - 131.5$$

7.3. Viscosity Reduction Experiments

7.3.1. Surfactant Packages and Emulsification of Oils

The compositions of five surfactant packages which have been used successfully to emulsify Boscan crude oil are presented in Table X. The α-emulsan used was prepared from a technical grade α-emulsan according to the method described in Section 7.1. The chemical surfactants, Tergitol 15-S-X (where X indicates the number of moles of ethylene oxide), Tergitol TMN-6, Tergitol NP-40 (Union Carbide Corp.), Triton X-114 (Rohm & Haas Co.) and Alfonic 1412-A (Conoco) are commercially available. Emulsions were formed in an Osterizer Galaxy 14 blender at low speed in a manner preventing the beating of air into the emulsion. The ratio of Boscan crude to deionized water was 70:30 by volume (v/v). The surfactant packages were used successfully over a range of 1:250–1:2,000 [surfactant package:oil, by weight (w/w)]. The surfactant package comprising 15% α-emulsan, 42.5% Tergitol NP-40 and 42.5% Alfonic 1412-A was considered a preferred surfactant package for use with Boscan crude oil. Emulsions (70/30, Boscan crude/deionized water) formed with this surfactant package at 1 part per 2,000 parts oil have been observed to be stable and maintain reduced viscosities for a period of at least three weeks. In addition, this surfactant package has been used to form 70/30 Boscan crude/water emulsions at as low a treatment rate as 1 part per 20,000 parts oil.

TABLE X

SURFACTANT PACKAGES FOR EMULSIFYING BOSCAN CRUDE

| | % of Component (w/w) in Surfactant Package Package # | | | | |
| --- | --- | --- | --- | --- | --- |
| Component | 1 | 2 | 3 | 4 | 5 |
| α-Emulsan | 10 | 13 | — | 15 | 15 |
| Tergitol 15-S-X | 90 | — | — | — | — |
| Tergitol TMN-6 | — | 22 | — | — | — |
| Tergitol NP-40 | — | — | 100 | 85 | 42.5 |
| Triton X-114 | — | 65 | — | — | — |

TABLE X-continued
SURFACTANT PACKAGES FOR EMULSIFYING BOSCAN CRUDE

| | % of Component (w/w) in Surfactant Package Package # | | | | |
|---|---|---|---|---|---|
| Component | 1 | 2 | 3 | 4 | 5 |
| Alfonic 1412-A | — | — | — | — | 42.5 |

Other surfactants which successfully [alone or in combination] emulsified general type viscous oils included Alfonic 1012-60 (Conoco, Inc.), an ethoxylated linear alcohol with chain lengths of 10 to 12 carbon atoms ($C_{10}$–$C_{12}$) and 60% ethoxylation; Protowet 4196 (Proctor Chemical Co.), a sodium salt of a sulfosuccinate of a nonyl phenol ethoxylate; Protowet 4337 (Proctor Chemical Co.), sodium dicyclohexyl sulfosuccinate; Tween 80 (ICI Americas, Inc.), polyoxyethylene (20) sorbitan monooleate; Pluronic F88 (BASF Wyandotte), a block copolymer of propylene oxide and ethylene oxide; Petronate L (Witco Chemical Corp.) a sodium petroleum sulfonate, and Conoco AXS (Conoco, Inc.,), ammonium xylene sulfonate.

Table XI lists the types of oils that have and have not yet been successfully emulsified into stable emulsions (see Section 3) with various surfactant packages. All the oils listed as having been successfully emulsified to form stable emulsions can be emulsified with a surfactant package comprising 15% α-emulsan, 42.5% Tergitol NP-40, and 42.5% Alfonic 1412-A (weight percent) used at 1 part per 500 parts oil by weight. The method used for determining paraffin and aromatic content (weight percent) is described in Section 7.2.4.

TABLE XI
PARAFFIN/AROMATIC CONTENT AND EMULSION STABILITY

| Oil Type | Paraffin % | Aromatic % | Form Stable Emulsions |
|---|---|---|---|
| Boscan Crude | 26 | 49 | yes |
| Uinta Crude | 83 | 3 | no |
| So. Calif. Fuel Oil | 69 | 12 | no |
| Texas Fireflood Crude | 26 | 51 | yes |
| Bombay Crude | 75 | 8 | no |
| Number 6 Residual Fuel Oil | 24 | 78 | yes |
| Jibaro Crude | 19 | 64 | yes |
| El Jobo Crude | 13 | 52 | yes |
| Kansas Crude | 48 | 41 | yes |

7.3.2. Effect of Methanol in Aqueous Phase on Hydrocarbosol Viscosity

Hydrocarbosols were formed in a blender at low speed (in a manner preventing the beating of air into the emulsion) with methanol incorporated into the aqueous phase. The hydrocarbon used was a mixture of Number 6 residual fuel oils, designated Amelia Fuel oil. The specific gravity of Amelia Fuel oil was 0.996 and its API gravity was 10.6° API. The viscosity versus temperature profile is shown in Table XII.

TABLE XII
VISCOSITY VS. TEMPERATURE FOR AMELIA FUEL OIL

| Viscosity (cp) | Temperature (°F.) |
|---|---|
| 1046 | 100 |
| 1405 | 90 |
| 2190 | 80 |
| 3578 | 70 |
| 6209 | 60 |

The surfactant package comprised 15% α-emulsan, 42.5% Tergitol NP-40 and 42.5% Alfonic 1412-A (w/w).

The surfactant package was added to aqueous phases containing various proportions of methanol and deionized water. The aqueous phases were blended at low speed for approximately 15 seconds to form hydrocarbosols wherein the ratio of Amelia Fuel to aqueous phase was 70:30 (v/v). Enough of the surfactant package was added to the aqueous phase such that the final proportion of surfactant package to Amelia Fuel in the hydrocarbosol was 1:250. Table XIII summarizes the variation of viscosity of the hydrocarbosol as the composition of the aqueous phase was varied. The results suggest that addition of methanol up to at least about 45% does not significantly affect viscosity reduction by the surfactant package.

TABLE XIII
EFFECT OF METHANOL IN AQUEOUS PHASE ON VISCOSITY

| %[1] Methanol | %[1] Water | Viscosity (cp)[2] |
|---|---|---|
| 0 | 100.0 | 58.5 |
| 1.0 | 99.0 | 29.2 |
| 2.5 | 97.5 | 32.1 |
| 4.9 | 95.1 | 61.2 |
| 10.0 | 90.0 | 34.3 |
| 11.5 | 88.5 | 37.9 |
| 12.9 | 87.1 | 35.0 |
| 15.0 | 85.0 | 39.4 |
| 24.7 | 75.3 | 76.4 |
| 44.3 | 55.7 | 82.3 |
| 100.0 | 0 | 1753.7 |

[1]Weight percent
[2]at 100° F.

7.3.3. Effect of Water Content on Hydrocarbosol Viscosity

Experiments were performed with the Boscan crude oil described in Section 7.2.1, the Number 6 residual test fuel oil described in Section 7.2.3 and the Amelia Fuel oil described in Section 7.3.2 to determine the effect of variations in the proportion of the aqueous phase to oil phase on hydrocarbosol viscosity. The surfactant package used in all three sets of experiments comprised 15% α-emulsan, 42.5% Tergitol NP-40 and 42.5% Alfonic 1412-A (w/w). The viscosities reported in Tables XIV, XV and XVI were measured on the Rheomat 30 as described in Section 7.2.4.

Figure 1:
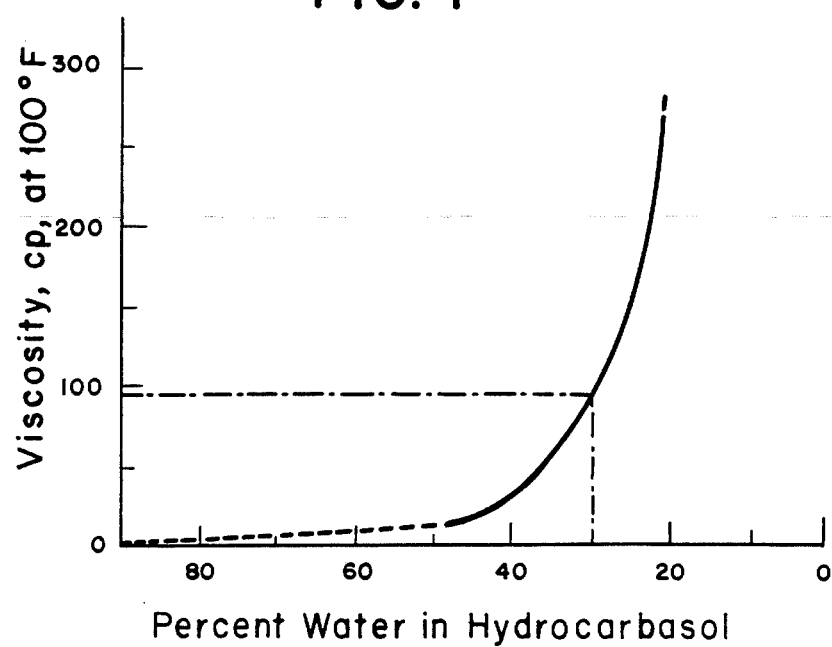
FIG. 1 is a graphical representation of the viscosity versus water content profile of emulsan-stabilized hydrocarbosols formulated with Boscan crude oil, wherein the dashed line (at 30% water) indicates near-optimum operating conditions.

Boscan crude oil was emulsified at low speed in a blender (as in Section 7.3.1) in various proportions of water using a surfactant package ratio of 1:250 based on oil. Viscosities were measured at 100° F. The data are tabulated in Table XIV and presented graphically in FIG. 1.

TABLE XIV
EFFECT OF WATER CONTENT ON VISCOSITY OF BOSCAN CRUDE OIL HYDROCARBOSOLS

| Water Content, % (v/v) | Viscosity (cp) at 100° F. |
|---|---|
| 24 | 202 |
| 27 | 140 |

TABLE XIV-continued

| EFFECT OF WATER CONTENT ON VISCOSITY OF BOSCAN CRUDE OIL HYDROCARBOSOLS | |
|---|---|
| Water Content, % (v/v) | Viscosity (cp) at 100° F. |
| 30 | 111 |
| 33 | 82 |
| 35 | 51 |
| 39 | 36 |

Similarly, Number 6 residual test fuel oil was emulsified in various proportions of deionized water using a surfactant package ratio of 1:250 based on oil. Viscosities were measured at 100° F. The data are tabulated in Table XV.

TABLE XV

| EFFECT OF WATER CONTENT ON VISCOSITY OF NUMBER 6 FUEL OIL HYDROCARBOSOLS | |
|---|---|
| Water Content, % (v/v) | Viscosity (cp) at 100° F. |
| 14 | 1002.1 |
| 16 | 417.6 |
| 23 | 89.5 |
| 27 | 53.7 |
| 33 | 71.6 |

Additionally, Amelia Fuel oil was emulsified in various proportions of an aqueous phase consisting of 13.3% (w/w) methanol and 86.7% (w/w) deionized water using a surfactant package ratio of 1:250 based on oil. Viscosities were measured at 100° F. The data are tabulated in Table XVI.

TABLE XVI

| EFFECT OF AQUEOUS PHASE CONTENT ON VISCOSITY OF AMELIA FUEL OIL HYDROCARBOSOLS | |
|---|---|
| Aqueous Phase Content, % (v/v) | Viscosity (cp) at 100° F. |
| 18 | 1074 |
| 21 | 573 |
| 24 | 54 |
| 27 | 38 |
| 30 | 33 |

In all three cases, as the oil:water ratio was increased, the viscosity similarly increased.

7.3.4. Temperature Effects on Hydrocarbosols

Figure 2:
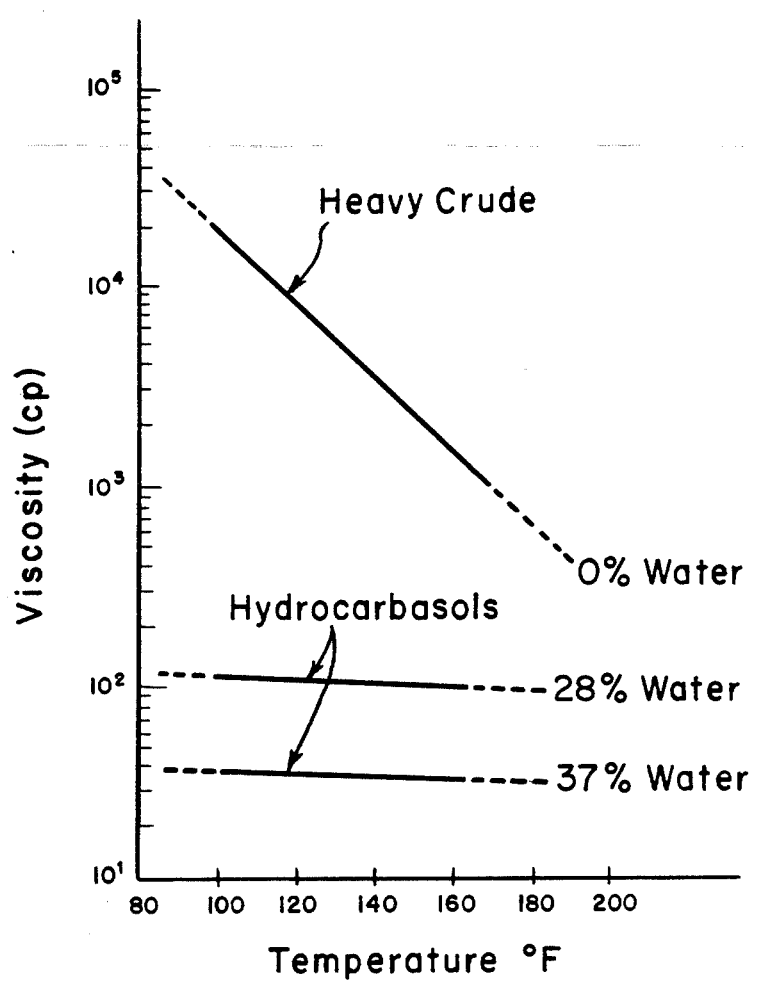
FIG. 2 is a graphical representation of the viscosity versus temperature profiles for a heavy crude oil (Boscan) and two emulsan-stabilized hydrocarbosols formulated with Boscan crude oil.
Figure 3:
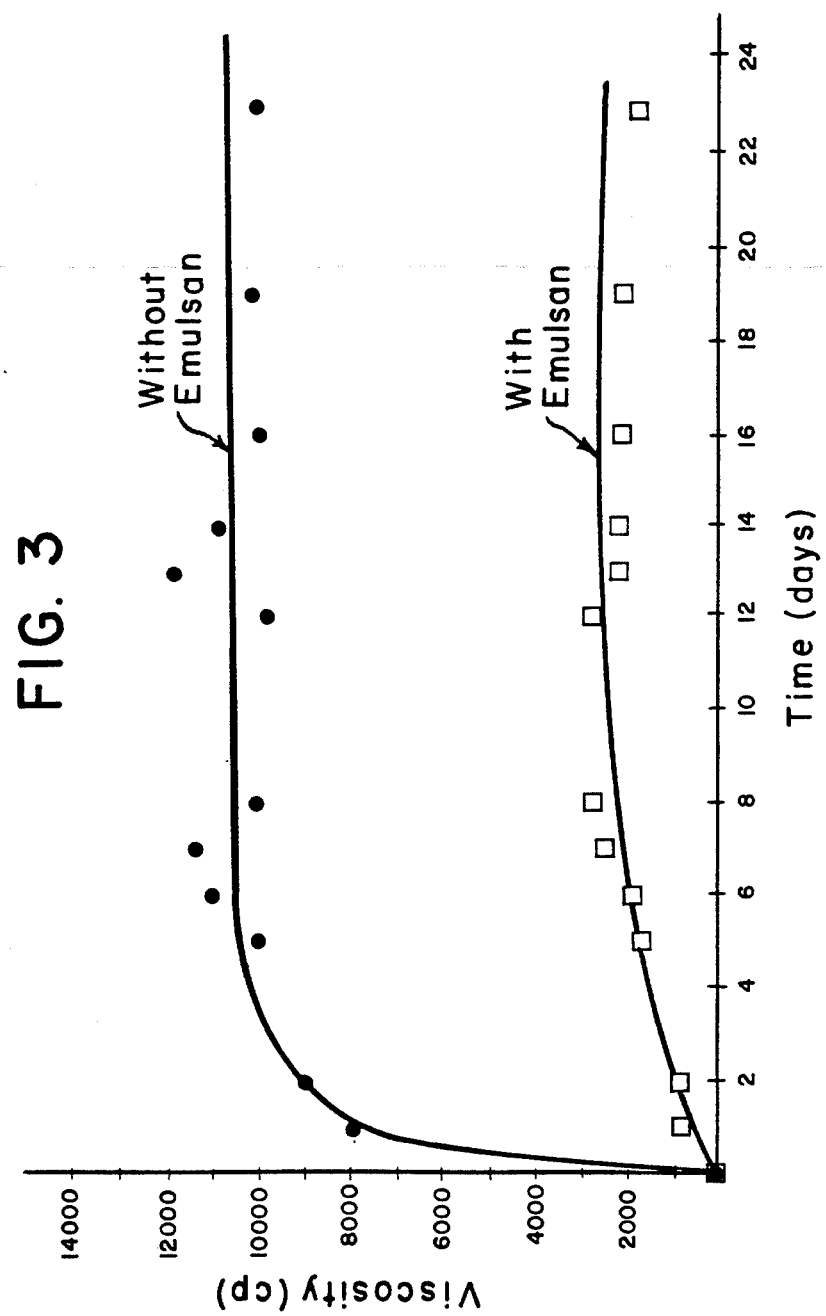
FIG. 3 is a graphical representation of the viscosity versus time profiles for two emulsions formulated with a Texas fireflood crude oil and a surfactant package comprising a nonionic surfactant and an anionic surfactant, showing the effect on viscosity of the addition of emulsan to the surfactant package.
Figure 4:
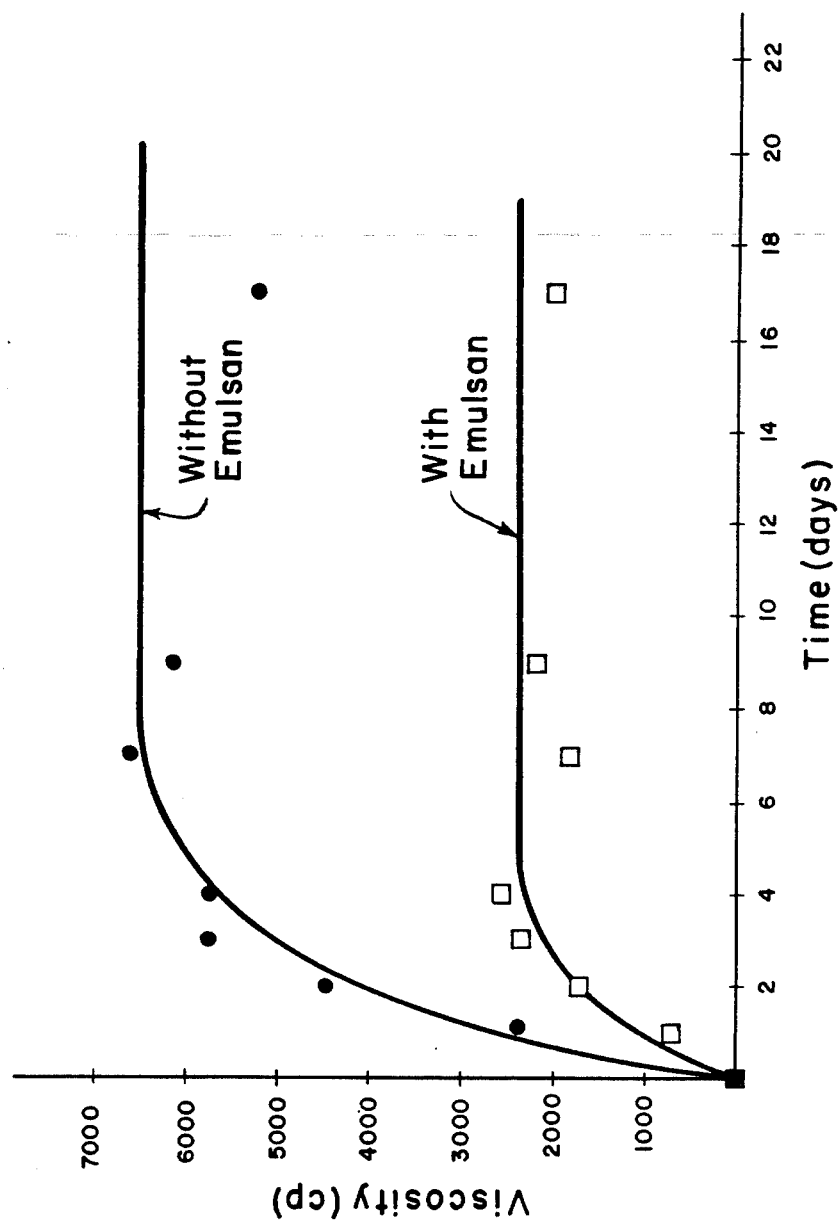
FIG. 4 is a graphical representation of the viscosity versus time profiles for two emulsions formulated with a Texas fireflood crude oil and a surfactant package comprising a nonionic surfactant, showing the effect on viscosity of the addition of emulsan to the surfactant package.
Figure 5:
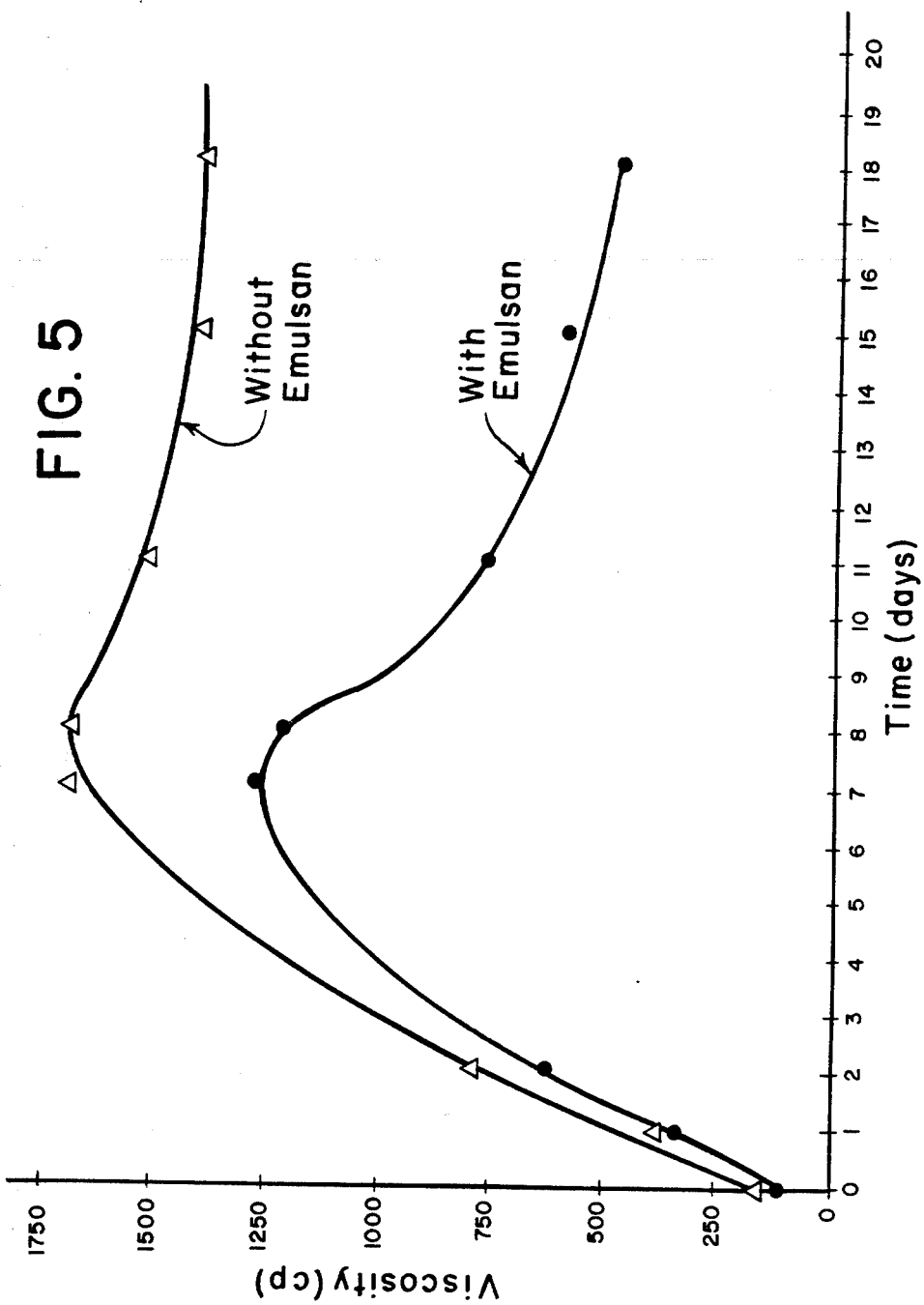
FIG. 5 is a graphical representation of the viscosity versus time profiles for two emulsions formulated with a Kansas crude oil and tap water using a surfactant package comprising a nonionic surfactant and an anionic surfactant, showing the effect on viscosity of the addition of emulsan to the surfactant package.
Figure 6:
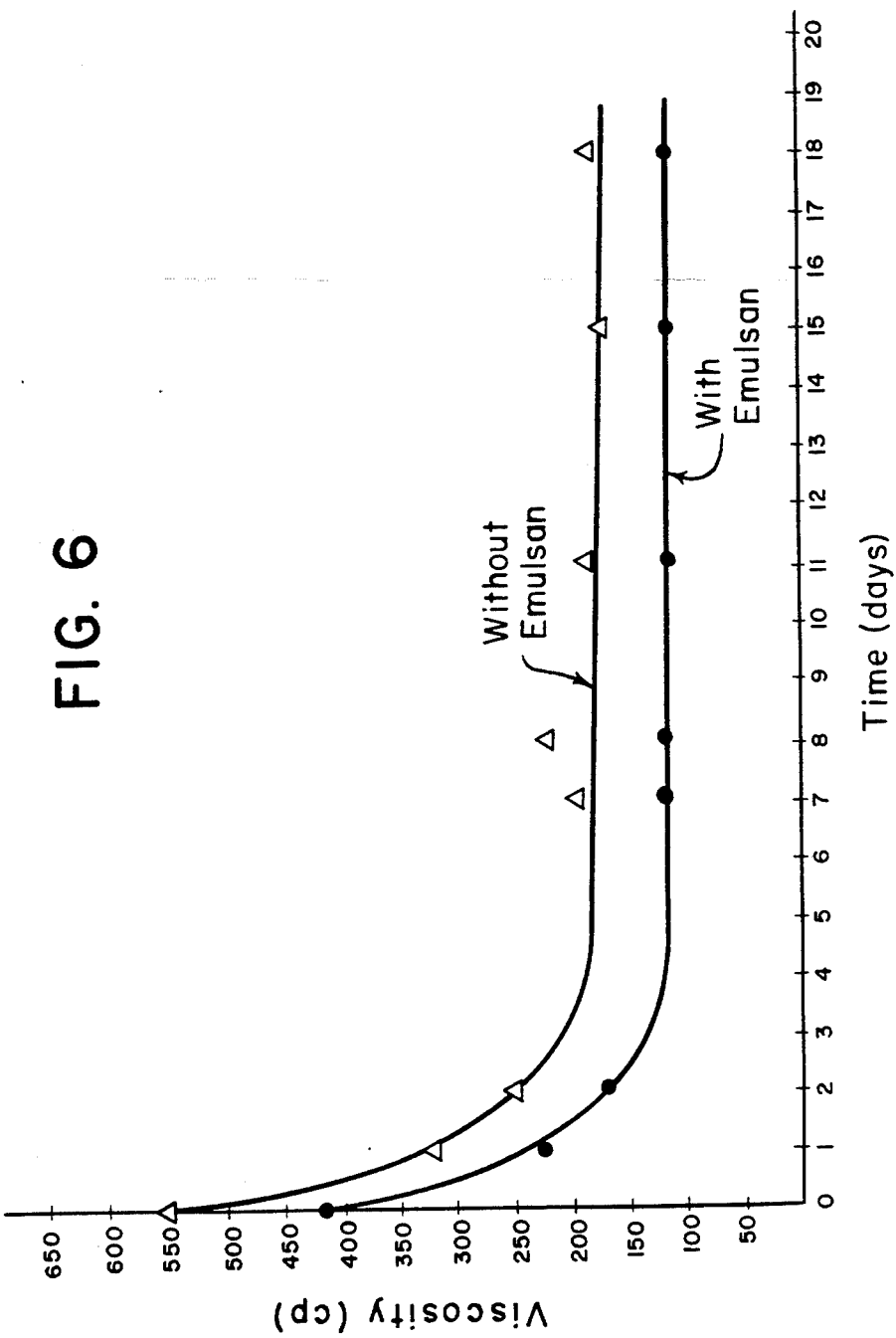
FIG. 6 is a graphical representation of the viscosity versus time profiles for two emulsions formulated with a Kansas crude oil and Texas brine using a surfactant package comprising a nonionic surfactant and an anionic surfactant, showing the effect on viscosity of the addition of emulsan to the surfactant package.

Hydrocarbosols were prepared at low speed in a blender (as in Section 7.3.1) with Boscan crude oil at oil:water ratios of 72:28 and 63:37 (v/v) using a surfactant package comprising [15% α-emulsan, 42.5% Tergitol-NP40 and 42.5% Alfonic 1412-A (w/w)] at a ratio of 1:250 based on oil. The viscosity versus temperature profiles of emulsan-stabilized Boscan crude oil hydrocarbosols were compared to the viscosity versus temperature profiles of the unemulsified crude oil. The temperature effects on hydrocarboasols were much less pronounced than on the crude oil from which the hydrocarbosols were formulated as depicted in FIG. 2.

7.3.5. Comparative Static Testing

The purpose of these experiments was to determine the stability under static conditions of oil-in-water emulsions of viscous crude oils made with surfactant packages comprising chemical surfactants, with or without bioemulsifier. Specifically, the determination of the time course over which the oil-in-water emulsions maintained a reduced viscosity without breaking or inverting was desired to assess the ease and success with which such emulsions can be handled for transportation and/or storage purposes. Behavior of viscous crude oil-in-water emulsions was of further interest with regard to the possiblity of pump failures and shut-downs during pipelining operations where emulsion stability is desirable to avoid emulsion breakage and circumvent the need to re-emulsify prior to re-start of operations.

Several surfactant packages, the compositions of which are shown in Table XVII, were used to prepare oil-in-water emulsions [oil:water=70:30 on a volume per volume (v/v) basis] in which the ratio of surfactant package to oil was 1:500 on a weight per weight (w/w) basis. The surfactants used to formulate the surfactant packages of Table XVII are commercially available: Tergitol NP-40 (Union Carbide Corporation) or Alfonic 1412-A (Conoco, Inc.). The surfactant packages were formulated with or without α-emulsan as indicated in the table directly below.

TABLE XVII

| COMPOSITIONS OF SURFACTANT PACKAGES USED IN STATIC TESTING OF EMULSION STABILITY | | | |
|---|---|---|---|
| Surfactant Package | % of Component (w/w) in Surfactant Package | | |
| | α-Emulsan | Tergitol NP-40 | Alfonic 1412-A |
| A | 0 | 100 | 0 |
| B | 15 | 85 | 0 |
| C | 0 | 50 | 50 |
| D | 15 | 42.5 | 42.5 |
| E | 50 | 25 | 25 |

The method used to prepare oil-in-water emulsions for these experiments was as follows. Into a suitable container, an amount of crude oil was weighed so as to make up 70% (v/v) of the final emulsion. The crude oils used were the Boscan and Texas Fireflood crudes as described in Sections 7.2.1 and 7.2.2, supra and also a Kansas crude. The oil was then heated to 50°-60° C. Into a separate container, the particular surfactant package chosen (see Table XVII) was weighed so as to yield a 1:500 ratio (w/w) of surfactant package to oil in the final emulsion. Sufficient make-up water was added to the surfactant package to provide a 30% (v/v) aqueous phase in the final emulsion. Three types of aqueous phases were used: tap water, deionized water, or Texas brine. The Texas brine comprised ions in the following approximate concentrations [in parts per million (ppm)]: sodium, 28,600; calcium, 1,800; magnesium, 290; ferric, 27; barium, 17; chloride, 47,900; bicarbonate, 540; and sulfate, 12. The aqueous phase was added to the oil phase and blended using typical blender blades at low speed, as in Section 7.3.1, i.e., in a manner preventing the beating of the air into emulsion. The individual emulsions were stored in sealed containers for periods of up to 29 days. The viscosity was measured daily with a Brookfield RVT Viscometer (Brookfield Engineering), equipped with an RV3 spindle, at 10 rpm at ambient (70°-80° F.) temperature. Five groups of emulsions were subjected to the test and their compositions are indicated in Table XVIII.

TABLE XVIII

| EMULSION COMPOSITIONS[1] | | | |
|---|---|---|---|
| Group | Oil | Aqueous | Surfactant Package[2] |
| 1 | Texas Fireflood Crude | Tap Water | C |
| | | | D |
| | | | E |
| 2 | Boscan Crude | Deionized Water | A |
| | | | B |
| 3 | Boscan Crude | Texas Brine | A |
| | | | B |

TABLE XVIII-continued

EMULSION COMPOSITIONS[1]

| Group | Oil | Aqueous | Surfactant Package[2] |
|---|---|---|---|
| 4 | Texas Fireflood Crude | Deionized Water | A |
|   |   |   | B |
| 5 | Texas Fireflood Crude | Texas Brine | A |
|   |   |   | B |
| 6 | Kansas Crude[3] | Tap Water | C |
|   |   |   | D |
| 7 | Kansas Crude | Texas Brine | C |
|   |   |   | D |

[1] All emulsions were 70:30, oil:water (v/v).
[2] Surfactant Packages are defined in Table XVII and were used at 1:500, surfactant package:oil (w/w), except for Groups 6 and 7 where the proportion was 1:1,000.
[3] Kansas crude oil has a viscosity of 1,127 cp at 76° F. The specific gravity is 0.941 and the API gravity is 18.9° API.

The results for Groups 1–7 (see Table XVIII) are tabulated in Tables XIX–XXV, respectively.

TABLE XIX

STATIC TEST DATA - GROUP 1

| | % $\alpha$-Emulsan (w/w) in Surfactant Package | | |
|---|---|---|---|
| | 0 | 15 | 50 |
| Time (days) | Viscosity (cp) | | |
| 0 | 155 | 92 | 138 |
| 1 | 7850 | 700 | 6900 |
| 2 | 8920 | 720 | 2802 |
| 5 | 9920 | 1616 | 3700 |
| 6 | 10960 | 1790 | 6234 |
| 7 | 11385 | 2425 | 5130 |
| 8 | 10067 | 2717 | 4100 |
| 12 | 9800 | 2791 | 3495 |
| 13 | 11820 | 2107 | 3900 |
| 14 | 10880 | 2133 | 2997 |
| 16 | 10000 | 2060 | 2800 |
| 19 | 10200 | 2060 | 2570 |
| 23 | 10100 | 1732 | 2288 |
| 29 | 11700 | 1948 | 2760 |

TABLE XX

STATIC TEST DATA - GROUP 2

| | % $\alpha$-Emulsan (w/w) in Surfactant Package | |
|---|---|---|
| | 0 | 15 |
| Time (days) | Viscosity (cp) | |
| 1 | 65 | 76 |
| 2 | 76 | 84 |
| 3 | 84 | 122 |
| 4 | 91 | 122 |
| 7 | 84 | 129 |
| 9 | 53 | 122 |
| 17 | 60 | 122 |

TABLE XXI

STATIC TEST DATA - GROUP 3

| | % $\alpha$-Emulsan (w/w) in Surfactant Package | |
|---|---|---|
| | 0 | 15 |
| Time (days) | Viscosity (cp) | |
| 1 | 160 | 152 |
| 2 | 167 | 152 |
| 3 | 144 | 163 |
| 4 | 141 | 129 |
| 7 | 167 | 144 |
| 9 | 130 | 129 |
| 17 | 144 | 122 |

TABLE XXII

STATIC TEST DATA - GROUP 4

| | % $\alpha$-Emulsan (w/w) in Surfactant Package | |
|---|---|---|
| | 0 | 15 |
| Time (days) | Viscosity (cp) | |
| 1 | 2443 | 733 |
| 2 | 4492 | 1775 |
| 3 | 5799 | 2371 |
| 4 | 5776 | 2580 |
| 7 | 6616 | 1847 |
| 9 | 6190 | 2204 |
| 17 | 5282 | 2037 |

TABLE XXIII

STATIC TEST DATA - GROUP 5

| | % $\alpha$-Emulsan (w/w) in Surfactant Package | |
|---|---|---|
| | 0 | 15 |
| Time (days) | Viscosity (cp) | |
| 1 | 114 | 103 |
| 2 | 137 | 91 |
| 3 | 106 | 84 |
| 4 | 110 | 106 |
| 7 | 110 | 114 |
| 9 | 99 | 118 |
| 17 | 84 | 91 |

TABLE XXIV

STATIC TEST DATA - GROUP 6

| | % $\alpha$-Emulsan (w/w) in Surfactant Package | |
|---|---|---|
| | 0 | 15 |
| Time (days) | Viscosity (cp) | |
| 0 | 171 | 114 |
| 1 | 380 | 342 |
| 2 | 798 | 633 |
| 7 | 1697 | 1279 |
| 8 | 1691 | 1222 |
| 11 | 1526 | 773 |
| 15 | 1406 | 602 |
| 18 | 1406 | 494 |

TABLE XXV

STATIC TEST DATA - GROUP 7

| | % $\alpha$-Emulsan (w/w) in Surfactant Package | |
|---|---|---|
| | 0 | 15 |
| Time (days) | Viscosity (cp) | |
| 0 | 551 | 418 |
| 1 | 323 | 228 |
| 2 | 253 | 171 |
| 7 | 196 | 133 |
| 8 | 222 | 133 |
| 11 | 184 | 114 |
| 15 | 171 | 114 |
| 18 | 184 | 114 |

The results for Group 1 indicate that for emulsions of the Texas fireflood crude in tap water, the addition of 15% (w/w) $\alpha$-emulsan to a surfactant package containing co-surfactants Tergitol NP-40 and Alfonic 412-A was preferable to the addition of 50% (w/w) $\alpha$-emulsan and was also preferable to excluding $\alpha$-emulsan from the surfactant package. The results for Group 2 indicate that for emulsions of the Boscan crude in deionized water, the addition of 15% (w/w) $\alpha$-emulsan to a surfactant package containing Tergitol NP-40 only did not improve viscosity reduction, although the measured viscosities of either emulsion, i.e., with or without $\alpha$- emulsan, were acceptably reduced. The results for Group 3 indicate that for emulsions of the Boscan crude in Texas brine, the addition of α-emulsan to a surfactant package containing Tergitol NP-40 alone did not yield significantly different results from the surfactant package without α-emulsan. Nevertheless, either surfactant package, i.e., with or without α-emulsan yielded acceptably reduced viscosities. The results further demonstrated that brine can be used as aqueous phase. The results for Group 4 indicate that for emulsions of the Texas fireflood crude in deionized water, the addition of 15% (w/w) α-emulsan to a surfactant package containing Tergitol NP-40 only is preferable to omitting α-emulsan from the surfactant package. The results of Group 5 indicate that for emulsions of the Texas fireflood crude in Texas brine, the addition of o-emulsan to a surfactant package containing Tergitol NP-40 alone did not yield significantly different results from the surfactant package without α-emulsan. Nevertheless, either surfactant package, i.e., with or without α-emulsan yielded acceptably reduced viscosities. Comparison of the Group 4 data with that of Group 5 dramatically illustrates the effect of different aqueous phases on the viscosities of Texas fireflood crude oil-in-water emulsions. The data indicate that the use of Texas brine is preferable to the use of deionized water for forming oil-in-water emulsions with Texas fireflood crude. The results for Groups 6 and 7 indicate that for emulsions of the Kansas crude in tap water or Texas brine, the addition of 15% (w/w) α-emulsan to a surfactant package containing co-surfactants Tergitol NP-40 and Alfonic 1412-A was preferable to the exclusion of α-emulsan from the surfactant package. The data from these groups illustrate how the viscosity versus time profiles of emulsions of the same crude oil can vary dramatically as a function of the aqueous phase and also that the viscosity versus time behavior of one type of crude oil/water emulsion can be signficantly different than that of other crude oil/water emulsions.

That the presence of α-emulsan in surfactant packages used to emulsify Texas fireflood crude oil or Kansas crude oil has a significant effect on emulsion stability and maintenance of reduced viscosities can be seen in FIGS. 3, 4, 5 and 6 where the data from Groups 1, 4, 6 and 7 (Tables XIX, XXII, XXIV and XXV for 0% and 15% α-emulsan) are presented graphically. The lower curves in each figure represent the viscosity versus time profiles for α-emulsan-stabilized hydrocarbosols. The viscosities of the α-emulsan-stabilized hydrocarbosols remain significantly more reduced than that of the emulsions formed with surfactant packages that did not include α-emulsan.

7.3.6. Stabilizer Comparisons

An experiment was performed to compare the emulsion-stabilizing effect of α-emulsan with that of known chemical emulsion-stabilizers, naphthalene sulfonate and lignin sulfonate. Specifically, the viscosity versus time profiles at 75° F. were followed for four emulsions containing either α-emulsan, naphthalene sulfonate or lignin sulfonate or no stabilizer at all. All emulsions were formulated with the Texas fireflood crude described in Section 7.2.2. at an oil:water ratio of 70:30 (v/v). Surfactant packages were used at a ratio of 1:500 (w/w) based on oil. The results are shown in FIG. 7. The α-emulsan-stabilized hydrocarbosol was formulated with a surfactant package comprising 15% α-emulsan, 42.5% Tergitol NP-40, and 42.5% Alfonic 1412-A (w/w); its viscosity versus time profile is the curve depicted by closed circles. The naphthalene sulfonate-stabilized emulsion was formulated with a surfactant package comprising 15% naphthalene sulfonate, 42.5% Tergitol NP-40 and 42.5% Alfonic 1412-A (w/w); its viscosity versus time profile is the curve depicted by closed triangles. The lignin sulfonate-stabilized emulsion was formulated with a surfactant package comprising 15% lignin sulfonate; 42.5% Tergitol NP-40 and 42.5% Alfonic 1412-A (w/w); its viscosity versus time profile is the curve depicted by closed inverted closed triangles. A fourth emulsion (the control) was formulated with a surfactant package comprising 50% Tergitol NP-40 and 42.5% Alfonic 1412-A (w/w) with no additional emulsion stabilizer; its viscosity versus time profile is the curve depicted by open squares.

Immediately after emulsion formation a zero time point measurement was taken. Thereafter the emulsions were allowed to remain stationary for 28 days during which time period viscosities of the four emulsions were measured daily to determine the increase, if any, in viscosity. The points in FIG. 7 represented by stars indicate that by day 8 for the naphthalene sulfonate stabilized emulsion and by day 12 for the lignin sulfonate-stabilized emulsion, these two emulsions had failed, i.e., inverted into water-in-oil emulsions. It can be seen from FIG. 7 that under the conditions of the experiment, α-emulsan was a significantly more effective stabilizer of Texas fireflood crude oil:water emulsions than were either of the two chemical stabilizers (lignin sulfonate and naphthalene sulfonate) or the co-surfactants (Tergitol NP-40 and Alfonic 1412-A) alone.

7.4. Pipelining Pilot Test

A pilot scale field test was conducted to determine how a hydrocarbosol would perform under simulated pipelining conditions. Approximately 29 barrels (BBL) of the Boscan crude oil described in Section 7.2.1. were emulsified into approximately 12 barrels of aqueous phase to form an oil-in-water emulsion. The final oil phase to aqueous phase ratio was 70/30 (v/v). The aqueous phase consisted of tapwater supplied by the Tulsa, Oklahoma municipal system (total dissolved solids: 221 ppm; total hardness: 151 ppm). Emulsification was accomplished by mixing warm oil with surfactant-containing aqueous phase using a centrifugal pump. The surfactant package used comprised α-emulsan and Tergitol NP-40 and at 15% and 85%, respectively. The surfactant package was used at a treatment rate of 1 part surfactant package to 500 parts oil by weight.

The resulting hydrocarbosol was continuously circulated in a pipe loop at an average velocity of 6.7 ft/sec (3.125 inch I.D., 2,560 feet long) for 96 hours using a centrifugal pump. This is shown schematically in FIG. 8

During the entire test run the observed hydrocarbosol viscosity remained less than 100 cp. [Pressure drop/flow rate data indicated an apparent viscosity of approximately 70 cp at 60° F. for the hydrocarbosol throughout the operation.] This is in dramatic contrast to the viscosity of the Boscan crude before emulsification, approximately 192,000 cp. At the end of the continuous test period, flow through the loop was interrupted for 64 hours to simulate a pump failure. After three days of shutdown, pumping was resumed with no apparent change in hydrocarbosol characteristics. Pressure drops and flow rates were similar after restart as prior to shutdown. There was no need to reemulsify.

During this test, the hydrocarbosol was pumped an actual physical distance of approximately 380 miles. It traversed the pump once every 17 minutes. In this manner, the hydrocarbosol was subjected to stress (shear) roughly equivalent to being pumped a distance of 26,000 miles in a commercial pipeline (considering pipe diameters, pump transits, flow rates, etc.). Such stress is known to cause failure (inversion) of oil-in-water emulsions stabilized by conventional surfactants. Laboratory evaluation of the hydrocarbosol upon completion of the test demonstrated that, should demulsification be desirable, the emulsion could be demulsified readily using standard oilfield techniques. Table XXVI summarizes the pertinent numbers, results, and conditions of the pipelining pilot test.

TABLE XXVI
SUMMARY OF PIPELINING PILOT TEST DATA

| | |
|---|---|
| Oil/Water Ratio | 70/30 |
| Surfactant Package/Oil Ratio | 1/500 |
| Total Running Time | 96 hours |
| Shutdown time prior to successful restart | 64 hours |
| Average flow rate during run | 160 gpm |
| Average flow velocity | 6.69 ft/sec. |
| Pipe I.D. | 3.125 inches |
| Distance pumped | approx. 380 miles |
| Number of pump transits | approx. 530 |
| Apparent viscosity of emulsion | 70 cp |
| Viscosity of Boscan at 60° F. | 190,000 cp |
| Comparable flow rate in 20" line | 210,000 BBL/day |
| Comparable flow rate in 30" line | 475,000 BBL/day |

7.5. Direct Combustion Test on Number 6 Fuel Hydrocarbasol

7.5.1. Furnace Assembly and Instrumentation

The direct combustion test was run in a large scale (1 Megawatt) furnace assembly, essentially comprising in sequential arrangement: a burner, a brick-lined experimental chamber (also called the refractory-lined combustion tunnel), an after burner, a water-cooled (cold-wall) chamber and an exhaust section, approximately 1.14 meters (m), 4.55 m, 1.24 m, 4.55 m and 1.65 m in length, respectively. The other major components of the facility used include the systems for storage, metering, feeding and control of fuels, for pumping, preheating, and metering of the combustion air, and for cleaning and pumping the combustion products.

The furnace assembly is equipped with water-cooled probes for sampling combustion gases which are drawn off under vacuum and pass through a sample transport line to a set of continuous on-line gas analyzers, specifically a Chemiluminescent $NO-NO_x$ Gas Analyzer (Thermo Electron Corporation, Model 10A), an Infrared CO Analyzer (Beckman, Inc., Model 865), an Infrared $CO_2$ Analyzer (Beckman, Inc., Model 865) and a Paramagnetic $O_2$ Analyzer (Beckman, Inc., Model 755). The furnace assembly is also equipped with a water-cooled suction pyrometer for measuring axial flame temperatures at various flame positions within the experimental combustion tunnel. The furnace assembly is further equipped with water-cooled water quench sampling probes through which combustion gases, including particulates, are drawn off under vacuum, are quenched with water and flow through a sampling train, the first component of which is a filter (paper) for collection of solids. This equipment provides for the quantitation of solids in the combustion gases.

7.5.2. Preparation of Hydrocarbosol for Combustion Test

The characteristics of the Number 6 residual test fuel oil used as the oil phase of the oil-in-water emulsion are described in Section 7.2.3. Table XXVII summarizes the ultimate analysis of the fuel oil. Its heating value was 18,384 Btu/lb.

TABLE XXVII
NUMBER 6 RESIDUAL TEST FUEL OIL ULTIMATE ANALYSIS

| Constituent | % |
|---|---|
| Carbon | 85.63 |
| Hydrogen | 10.69 |
| Nitrogen | 0.47 |
| Sulfur | 2.30 |
| Oxygen | 0.91 |
| Ash | 0.08 |
| $H_2O$ | 0.10 |
| Asphaltenes | 10.44 |

The Number 6 fuel oil was emulsified in water using a surfactant package comprising 15% α-emulsan, 42.5% Tergitol NP-40, 42.5% Alfonic 1412-A (in weight percent). The surfactant package was used at a rate of 1 part per 250 parts oil (w/w). The ratio of oil to water in the resulting hydrocarbosol was approximately 70:30 (v/v). One hundred ten gallons of hydrocarbosol were prepared in a fuel preparation system which incorporates a Gaulin mechanical homogenizer. The aqueous solution containing the surfactant package was fed via a centrifugal pump into a mixing-T located in the Number 6 fuel oil supply line. This arrangement provided in-line pre-mixing of the oil and water prior to entering a 45 g.p.h. high-pressure mechanical homogenizer (Gaulin). The minimum homogenization pressure of 1000 psi was employed for producing the hydrocarbosol. The resulting hydrocarbosol had a viscosity ranging from 70–120 cp at 80° F.

Accurate control of both oil and water flow rates are required to maintain a constant 70/30 oil/water mass ratio during this continuous mixing process. Precise control of the water flow proved to be a problem due to the very low flow rates required, and it is estimated that the oil/water ratio varied between 65/35 and 75/25 during production. Two barrels of hydrocarbosol were produced with the following composition: Barrel #1—71.25%: 28.75% water by weight; and Barrel #2—69.78% oil: 30.22% water by weight. Both barrels of hydrocarbosol were produced one week prior to the combustion test and no separation was apparent during this time. Prior to the combustion test both barrels were stirred with a slow speed stirrer.

7.5.3. Combustion Test Procedure

Standard procedures for firing a Number 6 fuel oil in the type of furnace assembly employed were followed with the exception that the in-line fuel heaters were not used, and the hydrocarbosol was fired at a temperature of approximately 90° F.

The refractory-lined combustion tunnel was brought up to operating temperature (approximately 1000° C.) using natural gas. The gas gun was then removed and replaced by a standard oil gun fitted with a twin fluid atomizer of the Y-jet type. Compressed air at approximately 60 psi was used for the atomizing fluid.

The initial light-off on the oil burner was accomplished using a Number 2 oil as is standard practice. The air and fuel flow rates were then adjusted to give a thermal input of approximately 1 MW or 3.4 MM Btu/hr. A simple on-load fuel transfer from Number 2 fuel oil to the 70/30 hydrocarbosol was then effected by transferring the suction hose from the barrel of Number 2 fuel to the barrel of hydrocarbosol fuel.

A significant reduction in fuel flow rate occurred shortly after transfer to the hydrocarbosol fuel due primarily to the higher viscosity of the hydrocarbosol and the resultant pressure drop in the fuel lines. Stable flame conditions were maintained during the fuel transfer but good flame conditions could not be achieved as the fuel flow rate fell below the minimum required.

Initially the drop in fuel flow rate was thought to be due to blockage of the atomizer. The Y-jet atomizer was removed, cleaned, and replaced. Light-off was accomplished without any problem using the hydrocarbosol fuel but low fuel flow rates prevailed. A second atomizer, of the internal-mix type was then employed. Again light-off using the hydrocarbosol fuel presented no problem but the low fuel flow rate persisted.

Finally it was concluded that the flow problem was due to a partially blocked flow control valve. The nature of this blockage was not determined. A manual by-pass valve around the control valve was opened and the hydrocarbosol fuel-flow rate was increased to a maximum of approximately 4 lb/min (approximately 0.9 MW input). This resulted in an entirely satisfactory flame having visible characteristics very similar to those of a Number 6 fuel oil flame obtained under similar firing conditions.

A stable flame was maintained throughout the remainder of the test period, during which time minimum excess air levels, solids emissions, and axial flame temperatures were measured.

7.5.4. Results of Combustion Test

The ignitability and stability of the 70/30 hydrocarbosol were found to be comparable with those of a Number 6 fuel-oil when fired under similar conditions in the furnace assembly used.

Flame stability was found to be acceptable even when the important combustion parameters of excess air, minimum fuel flow rate, and atomization conditions were not matched. This occurred inadvertently during light-off and when fuel-flow rates fell below the limits for acceptable flame conditions. However, these results indicated that ignition and flame stability were not major problems of the hydrocarbosol fuel.

Minimum excess air levels of less than 2% were achieved without any visible smoke or carbon monoxide in the flue gas. These figures compare favorably with those attainable with a Number 6 fuel oil. Table XXVIII summarizes the range of operating conditions examined during this short test in terms of excess air levels and flue gas composition, the major point of interest being the low excess air levels that were obtained.

TABLE XXVIII

| EXCESS AIR DATA | | |
|---|---|---|
| % Oxygen in Flue Gas | % Excess Air | Carbon Monoxide (ppm) |
| 0.61 | 2.83 | 0 |
| 0.54 | 2.50 | 0 |
| 0.48 | 2.21 | 0 |
| 0.44 | 2.03 | 0 |
| 0.20 | 0.91 | 100–150 |

TABLE XXVIII-continued

| EXCESS AIR DATA | | |
|---|---|---|
| % Oxygen in Flue Gas | % Excess Air | Carbon Monoxide (ppm) |
| 0.16 | 0.73 | 150 |

Hydrocarbosol Input approx. 4 lb/min (0.93 MW Thermal Input)
Hydrocarbosol Temperature 90° F.
Atomizer air Preheat 500° F.

The visible frame length under these conditions was approximately 6 ft. and the general appearance of the flames was very similar to that of a Number 6 fuel oil flame. The exhaust gas on exit from the high temperature combustion zone appeared to contain a small amount of 'white-smoke', very similar in appearance to that observed when firing coal-water slurries under similar conditions. This 'white-smoke' was not visible on exit from the stack and its nature was not determined.

A water-cooled probe was used to obtain solids samples from the exhaust gas and along the axis of the flame. FIG. 9 shows the concentration profiles along the flame axis for a Number 6 fuel oil and the 70/30 hydrocarbosol. The solids concentration at the exit from the combustor was almost identical for these two fuels. The solids concentration within the flame was slightly lower for the 70/30 hydrocarbosol. These two flames were obtained using two different atomizers; nevertheless the data indicate that the carbon burnout achieved with the hydrocarbosol fuel was comparable to that for the parent Number 6 fuel.

Axial flame temperatures were also measured using a water cooled suction pyrometer and these are shown in FIG. 10. The 70/30 hydrocarbosol flame exhibited a slightly lower temperature along the entire length of the combustion chamber. This was entirely compatible with the quenching effect expected from the 30% water content. The measured reduction in flame temperature of 100°–150° C. does not represent a serious problem in most industrial combustion systems.

It is apparent that many modifications and variations of this invention as hereinabove set forth may be made without departing from the spirit and scope thereof. The specific embodiments described are given by way of example only and the invention is limited only by the terms of the appended claims.

We claim:
1. A method for utilizing viscous hydrocarbons as combustible fuels comprising:
(A) forming a hydrocarbosol using a surfactant package in a proportion of about 1:100 to about 1:20,000 by weight based on hydrocarbon,
　(1) said surfactant package comprising
　　(a) at least one water-soluble surfactant, an effective amount of which surfactant promotes emulsification of a hydrocarbon with API gravity of about 20° API or less, viscosity of about 100 centipoise or greater at 150° F., paraffin content of about 50% by weight or less and aromatic content of about 40% by weight or greater into an aqueous phase to form a hydrocarbon-in-water emulsion wherein the proportion of hydrocarbon to aqueous phase is about 90:10 by volume or less, the viscosity of which emulsion is reduced by at least a factor of about 10 compared to the viscosity of the hydrocarbon; and
　　(b) at least one water-soluble bioemulsifier, being a microboally-derived substance which predomi- nantly resides at hydrocarbon/water interfaces to substantially surround hydrocarbon droplets in hydrocarbon-in-water emulsions, an effective amount of which bioemulsifier stabilizes a hydrocarbon-in-water emulsion formed with a hydrocarbon as in (a) by maintaining viscosity reduced by at least a factor of about 10 for a period of at least about a day under static conditions,
(2) said hydrocarbosol
  (a) comprising a hydrocarbon characterized by an API gravity of about 20° API or less, viscosity of 100 centipoise or greater at 150° F., paraffin content of about 50% by weight or less and aromatic content of about 40% by weight or greater; and
  (b) having a hydrocarbon:water ratio of about 70:30 by volume; and
(B) burning the resultant hydrocarbosol.

2. A method for utilizing viscous hydrocarbons as combustible fuels comprising:
(A) forming a hydrocarbosol using a surfactant package in a proportion of about 1:100 to about 1:20,000 by weight based on hydrocarbon,
  (1) said surfactant package comprising
    (a) from about 1% to about 50% by weight of α-emulsan; and
    (b) from about 50% to about 99% by weight of a water-soluble nonionic surfactant selected from the group consisting of (i) an ethoxylated monoalkyl or dialkyl phenol represented by the formula $RC_6H_4(OC_2H_4)_nOH$ wherein R represents an alkyl group containing from about 8 to about 12 carbon atoms add wherein n represents the number of ethoxy groups ranging from about 1 to about 100 and (ii) an ethoxylated alcohol represented by the formula $R(OC_2H_4)_nOH$ wherein R represents a branched or linear aliphatic group containing from about 6 to about 18 carbon atoms and wherein n represents the number of ethoxy groups ranging from about 2 to about 100,
  (2) said hydrocarbosol
    (a) comprising a hydrocarbon characterized by an API gravity of about 20° API or less, viscosity of 100 centipoise or greater at 150° F., paraffin content of about 50% by weight or less and aromatic content of about 40% by weight or greater; and
    (b) having a hydrocarbon:water ratio of about 70:30 by volume; and
(B) burning the resultant hydrocarbosol.

3. A method for utilizing viscous hydrocarbons as combustible fuels comprising:
(A) forming a hydrocarbosol using a surfactant package in a proportion of about 1:100 to about 1:20,000 by weight based on hydrocarbon,
  (1) said surfactant package comprising
    (a) from about 1% to about 50% by weight of α-emulsan; and
    (b) from about 50% to about 99% by weight of a combination of (i) a water-soluble nonionic ethoxylated monoalkyl or dialkyl phenol represented by the formula $RC_6H_4(OC_2H_4)_nOH$ wherein R represents an alkyl group containing from about 8 to about 12 carbon atoms and wherein n represents the number of ethoxy groups ranging from about 1 to about 100 and (ii) a water-soluble anionic ethoxylated or nonethoxylated alcohol sulfate represented by the formula $R(OC_2H_4)_nOSO_3M$ wherein R represents an aliphatic group containing from about 6 to about 16 carbon atoms, n represents the number of ethoxy groups ranging from about 0 to about 4, and M is ammonium, sodium, potassium, calcium or triethanolamine, said combination being in a proportion of about 1:1 by weight,
  (2) said hydrocarbosol
    (a) comprising a hydrocarbon characterized by an API gravity of about 20° API or less, viscosity of 100 centipoise or greater at 150° F., paraffin content of about 50% by weight or less and aromatic content of about 40% by weight or greater; and
    (b) having a hydrocarbon:water ratio of about 70:30 by volume; and
(B) burning the resultant hydrocarbosol.

4. A method for utilizing viscous hydrocarbons as combustible fuels comprising:
(A) forming a hydrocarbosol using a surfactant package in a proportion of about 1:100 to about 1:20,000 by weight based on hydrocarbon,
  (1) said surfactant package comprising
    (a) about 15% by weight of α-emulsan;
    (b) about 42.5% by weight of ethoxylated monononyl phenol with about 40 ethoxy groups; and
    (c) about 42.5% by weight of ethoxylated monooctyl phenol with about 40 ethoxy groups,
  (2) said hydrocarbosol
    (a) comprising a hydrocarbon characterized by an API gravity of about 20° API or less, viscosity of 100 centipoise or greater at 150° F., paraffin content of about 50% by weight or less and aromatic content of about 40% by weight or greater and
    (b) having a hydrocarbon:water ratio of about 70:30 by volume; and
(B) burning the resultant hydrocarbosol.

5. A method for utilizing viscous hydrocarbons as combustible fuels, comprising (A) forming a hydrocarbosol using a surfactant package in a proportion of about 1:100 to about 1:20,000 by weight based on hydrocarbon, (1) said surfactant package comprising about 15% by weight of α-emulsan, about 42.5% by weight of an ethoxylated monononyl phenol with about 40 ethoxy groups and about 42.5% by weight of an ammonium salt of poly(3)ethoxy $C_{12}$–$C_{14}$ linear primary alcohol sulfate, (2) said hydrocarbosol (a) comprising a hydrocarbon characterized by API gravity of about 20° API or less, viscosity of 100 centipoise or greater at 150° F., paraffin content of about 50% by weight or less and aromatic content of about 40% by weight or greater and (b) having a hydrocarbon:water ratio of about 70:30 by volume; and
(B) burning the resultant hydrocarbosol.

6. A method for utilizing viscous hydrocarbons as combustible fuels, comprising (A) forming a hydrocarbosol using a surfactant package in a proportion of about 1:100 to about 1:20,000 by weight based on hydrocarbon, (1) said surfactant package comprising about 15% by weight α-emulsan and about 85% by weight of an ethoxylated alkyl phenol selected from the group consisting of ethoxylated monononyl phenol with about 40 ethoxy groups and ethoxylated monooctyl phenol with about 40 ethoxy groups, (2) said hydrocarbosol (a) comprising a hydrocarbon characterized by API gravity of about 20° API or less, viscosity of about 100 centipoise or greater at 150° F., paraffin content of about 50% by weight or less, and an aromatic content of about 40% by weight or greater and (b) having a hydrocarbon:water ratio of about 70:30 by volume and (B) burning the resultant hydrocarbosol.

7. A method for utilizing viscous hydrocarbons as combustible fuels, comprising (A) forming a hydrocarbon-in-water emulsion using an effective amount of a surfactant package comprising at least one water-soluble surfactant, said hydrocarbon-in-water emulsion (1) comprising a hydrocarbon characterized by a viscosity of about 100 centipoise or greater at 150° F. and (2) having a hydrocarbon:water ratio from about 60:40 to about 90:10 by volume; and (B) burning the resultant hydrocarbon-in-water emulsion.

8. A method for utilizing viscous hydrocarbons as combustible fuels, comprising: (A) forming a hydrocarbon-in-water emulsion using an effective amount of a surfactant package comprising at least one water-soluble surfactant, said hydrocarbon-in-water emulsion (1) comprising a hydrocarbon characterized by API gravity of about 20° API or less, viscosity of about 100 centipoise or greater at 150° F., paraffin content of about 50% by weight or less, and an aromatic content of about 40% by weight or greater and (2) having a hydrocarbon:water ratio from about 60:40 to about 90:10 by volume, and (B) burning the resultant hydrocarbon-in-water emulsion.

9. A method for utilizing viscous hydrocarbons as combustible fuels, comprising (A) forming a hydrocarbosol using an effective amount of a surfactant package comprising at least one water-soluble surfactant and at least one water-soluble bioemulsifier, said hydrocarbosol (1) comprising a hydrocarbon characterized by a viscosity of 100 centipoise or greater at 150° F. and (2) having a hydrocarbon:water ratio from about 60:40 to about 90:10 by volume; and (B) burning the resultant hydrocarbosol.

10. A method for utilizing viscous hydrocarbons as combustible fuels, comprising: (A) forming a hydrocarbosol using an effective amount of a surfactant package comprising at least one water-soluble surfactant and at least one water-soluble bioemulsifier, said hydrocarbosol (1) comprising a hydrocarbon characterized by API gravity of about 20° API or less, viscosity of about 100 centipoise or greater at 150° F., paraffin content of about 50% by weight or less, and an aromatic content of about 40% by weight or greater and (2) having a hydrocarbon:water ratio from about 60:40 to about 90:10 by volume and (B) burning the resultant hydrocarbosol.

11. The method of claim 7 wherein: (a) the surfactant package is used in a proportion from about 1:100 to about 1:20,000 by weight based on hydrocarbon; (b) said surfactant package comprises a nonionic ethoxylated monoalkyl or dialkyl phenol represented by the formula $RC_6H_4(OC_2H_4)_nOH$ wherein R represents an alkyl group containing from about 8 to about 12 carbon atoms and wherein n represents the number of ethoxy groups ranging from about 1 about 100; and (c) said hydrocarbon-in-water emulsion (i) comprises a hydrocarbon with API gravity of about 20° API or less, viscosity of about 100 centipoise or greater at 150° F., paraffin content of about 50% by weight or less and aromatic content of about 40% by weight or greater and (ii) has a hydrocarbon:water ratio from about 60:40 to about 90:10 by volume.

12. The method of claim 7 wherein: (a) the surfactant package is used in a proportion from about 1:100 to about 1:20,000 by weight based on hydrocarbon; (b) said surfactant package comprises in about a 1:1 proportion by weight a nonionic ethoxylated monoalkyl or dialkyl phenol represented by the formula $RC_6H_4(OC_2H_4)_nOH$ wherein R represents an alkyl group containing from about 8 to about 12 carbon atoms and wherein n represents the number of ethoxy groups ranging from about 1 about 100 and an anionic ethoxylated or nonethoxylated alcohol sulfate represented by the formula $R(OC_2H_4)_nOSO_3M$ wherein R represents an aliphatic group containing from about 6 to 16 carbon atoms, n represents the number of ethoxy groups ranging from about 0 to about 4 and M is ammonium, sodium, potassium, calcium or triethanolamine; and (c) said hydrocarbon-in-water emulsion i) comprises a hydrocarbon with API gravity of about 20° API or less, viscosity of about 100 centipoise or greater at 150° F., paraffin content of about 50% by weight or less and aromatic content of about 40% by weight or greater and ii) has a hydrocarbon:water ratio from about 60:40 to about 90:10 by volume.

13. The method of claim 11 or 12 wherein the nonionic ethoxylated monoalkyl phenol is selected from the group consisting of ethoxylated monononyl phenol with about 40 ethoxy groups and ethoxylated monooctyl phenol with about 40 ethoxy groups.

14. The method of claim 12 wherein the nonionic ethoxylated monoalkyl phenol is an ethoxylated monononyl phenol with about 40 ethoxy groups and the anionic ethoxylated alcohol sulfate is an ammonium salt of poly(3)ethoxy $C_{12}$–$C_{14}$ linear primary alcohol sulfate.

15. The method of claim 5, 6, 7, 9, 11, 12, 1, 2, 3, 4, 8 or 10 wherein the hydrocarbon-in-water emulsion is formed in an aqueous phase containing a methanol/water mixture with a methanol:water ratio of 45:55 by volume or less.

16. The method of claim 5, 6, 7, 9, 11, 12, 1, 2, 3, 4, 8 or 10 wherein the hydrocarbon is a residual fuel oil.

17. The method of claim 5, 6, 7, 9, 11, 12, 1, 2, 3, 4, 8 or 10 wherein the hydrocarbon is a Number 6 residual fuel oil.

18. The method of claim 5, 6, 7, 9, 11, 12, 1, 2, 3, 4, 8 or 10 wherein the hydrocarbon is a viscous crude oil.

19. The method of claim 18 wherein the viscous crude oil is Boscan crude oil.

20. The method of claim 18 wherein the viscous crude oil is Texas fireflood crude oil.

21. The method of claim 18 wherein the viscous crude oil is selected from: the group consisting of Jibaro crude oil, Bartra crude oil, El Jobo crude oil and Kansas crude oil.

* * * * *

REEXAMINATION CERTIFICATE (1261st)
United States Patent [19]
Hayes et al.

[11] B1 4,618,348

[45] Certificate Issued May 1, 1990

[54] COMBUSTION OF VISCOUS HYDROCARBONS

[75] Inventors: Michael E. Hayes, Fernandina Beach; Kevin R. Hrebenar, Jacksonville; Patricia L. Murphy; Laurence E. Futch, Jr., both of Fernandina Beach; James F. Deal, III, Amelia Island, all of Fla.

[73] Assignee: Petroleum Fermentations N.V., Curacao, Netherlands Antilles

Reexamination Request:
No. 90/001,581, Aug. 23, 1988

Reexamination Certificate for:
Patent No.: 4,618,348
Issued: Oct. 21, 1986
Appl. No.: 547,892
Filed: Nov. 2, 1983

[51] Int. Cl.$^5$ .............................................. C10L 1/32

[52] U.S. Cl. ........................................ 44/51; 252/309; 252/312; 252/356; 431/2

[58] Field of Search .................... 44/51; 252/312, 356, 252/309; 431/2

[56] References Cited

FOREIGN PATENT DOCUMENTS 0974042  4/1964  United Kingdom.
0969051  9/1964  United Kingdom.

OTHER PUBLICATIONS

Emulsions, Concise Encyclopedia of Chemical Technology, Kirk–Othmer, pp. 415–417 (1985) (Abridged version of 26 volume Encyclopedia, 3rd edition of 1978).

*Primary Examiner*—Jacqueline V. Howard

[57] ABSTRACT

Methods and compositions are provided to facilitate the transportation and combustion of highly viscous hydrocarbons by forming reduced viscosity hydrocarbon-in-water emulsions, and in particular, bioemulsifier-stabilized hydrocarbon-in-water emulsions.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6, 9, 10, 15-20 is confirmed.

Claims 7, 8 and 21 are determined to be patentable as amended.

Claims 11-20, dependent on an amended claim, are determined to be patentable.

7. A method for utilizing viscous hydrocarbons as combustible fuels, comprising [(A) forming] *burning* a hydrocarbon-in-water emulsion *formed* using an effective amount of a surfactant package comprising at least one water-soluble surfactant, said hydrocarbon-in-water emulsion (1) comprising a hydrocarbon characterized by a viscosity of about [100] *82,000* centipoise or greater at [150° F.] *80° F.* and (2) having a hydrocarbon:water ratio from about 60:40 to about 90:10 volume[; and (B) burning the resultant hydrocarbon-in-water emulsion].

8. A method for utilizing viscous hydrocarbons as combustible fuels, comprising [: (A) forming] *burning* a hydrocarbon-in-water emulsion *formed* using an effective amount of a surfactant package comprising at least one water-soluble surfactant, said hydrocarbon-in-water emulsion (1) comprising a hydrocarbon characterized by API gravity of about 20° API or less, viscosity of about [100] *82,000* centipoise or greater at [150° F.] *80° F.*, paraffin content of about 50% by weight or less, and an aromatic content of about 40% by weight or greater and (2) having a hydrocarbon:water ratio from about 60:40 to about 90:10 by volume[, and (B) burning the resultant hydrocarbon-in-water emulsion].

21. The method of claim 18 wherein the viscous crude oil is selected from: the group consisting of Jibaro crude oil, Bartra crude oil, [El Jobo crude oil] and Kansas crude oil.

* * * * *